United States Patent [19]
Shiomi

[11] Patent Number: 5,629,817
[45] Date of Patent: May 13, 1997

[54] CASSETTE LOADING APPARATUS HAVING A CASSETTE HOLDER AND A PAIR OF SLIDERS WHICH ARE SHORTER THAN THE CASSETTE HOLDER IN ONE DIRECTION

[75] Inventor: Tetsuhiro Shiomi, Kanagawa, Japan

[73] Assignee: Sony Corporation, Tokyo, Japan

[21] Appl. No.: 466,447

[22] Filed: Jun. 6, 1995

Related U.S. Application Data

[62] Division of Ser. No. 305,160, Sep. 13, 1994, Pat. No. 5,493,459, which is a division of Ser. No. 852,730, Mar. 17, 1992, Pat. No. 5,402,405.

[30] Foreign Application Priority Data

| Mar. 18, 1991 | [JP] | Japan | 3-077248 |
| Mar. 18, 1991 | [JP] | Japan | 3-077249 |
| Mar. 18, 1991 | [JP] | Japan | 3-077250 |
| Mar. 18, 1991 | [JP] | Japan | 3-077251 |
| Mar. 18, 1991 | [JP] | Japan | 3-077252 |

[51] Int. Cl.⁶ .................................................. G11B 15/675
[52] U.S. Cl. .................................................. 360/96.5; 360/85
[58] Field of Search .................... 360/96.5, 99.02, 360/94, 84, 85; 369/77.2, 75.2

[56] References Cited

U.S. PATENT DOCUMENTS

| 4,071,858 | 1/1978 | Eijiri | 360/93 |
| 4,434,444 | 2/1984 | Sato | 360/96.5 |
| 4,546,396 | 10/1985 | Schatteman | 360/96.5 |

(List continued on next page.)

FOREIGN PATENT DOCUMENTS

| 0286751 | 10/1988 | European Pat. Off. . |
| 0311390 | 4/1989 | European Pat. Off. . |
| 0317370 | 5/1989 | European Pat. Off. . |
| 0342619 | 11/1989 | European Pat. Off. . |
| 0388624 | 9/1990 | European Pat. Off. . |
| 3626939 | 2/1988 | Germany . |
| 3904483 | 3/1990 | Germany . |
| 61-175963 | 8/1986 | Japan | 360/96.5 |
| 63-298855 | 12/1988 | Japan | 360/96.5 |
| 2155232 | 9/1985 | United Kingdom . |
| 2187879 | 9/1987 | United Kingdom . |

OTHER PUBLICATIONS

Patent Abstracts of Japan vol. 3, No. 129 (E-147) 26 Oct. 1979.

Patent Abstracts of Japan, vol. 5, No. 182 (P-90) (854) 20 Nov. 1981.

Patent Abstracts of Japan, vol. 7, No. 274 (P-241) (1419) 7 Dec. 1983 & JP-A 58 153 264 (Sony) 12 Sep. 1983.

Patent Abstracts of Japan, vol. 9, No. 232 (P-389) 18 Sep. 1985.

(List continued on next page.)

*Primary Examiner*—Stuart S. Levy
*Assistant Examiner*—Kevin M. Watkins
*Attorney, Agent, or Firm*—William S. Frommer; Alvin Sinderbrand

[57] ABSTRACT

A cassette loading apparatus wherein a cassette holder has a long operating stroke and can be positioned readily and accurately at a cassette playing position. The cassette holder is mounted for movement under the guidance of L-shaped guides of a pair of side plates such that it first moves horizontally along horizontal guide portions and then moves vertically downwardly along vertical guide portions of the L-shaped guides to carry a cassette received thereon to a playing position. A pair of sliders each having an inclined guide are disposed for movement under the guidance of the horizontal guide portions of the L-shaped guides. When the sliders are driven to move horizontally, the holder is first moved horizontally by the sliders until guide pins thereon reach ends of the horizontal guide portions of the L-shaped guides and then engaging elements on the holder move downwardly along the inclined guides of the sliders to move the cassette holder downwardly to the cassette playing position under the guidance of the vertical guide portions of the L-shaped guides.

5 Claims, 28 Drawing Sheets

U.S. PATENT DOCUMENTS

| | | | |
|---|---|---|---|
| 4,631,607 | 12/1986 | Katsumata | 360/96.5 |
| 4,664,337 | 5/1987 | Shiratori | 242/199 |
| 4,673,994 | 6/1987 | Hida | 360/85 |
| 4,731,684 | 3/1988 | Suzuki | 360/96.5 |
| 4,786,996 | 11/1988 | Ohtani et al. | 360/94 |
| 4,796,117 | 1/1989 | Fleck | 360/96.5 |
| 4,878,138 | 10/1989 | Ando et al. | 360/96.5 |
| 4,949,203 | 8/1990 | Kunimaru et al. | 360/85 |
| 5,008,766 | 4/1991 | Chigasaki | 360/96.5 |
| 5,034,831 | 7/1991 | Miyawaki et al. | 360/94 |
| 5,046,169 | 9/1991 | Tsujino | 360/96.5 |
| 5,054,016 | 10/1991 | d'Alayer et al. | 369/270 |
| 5,237,470 | 8/1993 | Sasaki et al. | 360/94 |
| 5,293,550 | 3/1994 | Toyoguchi et al. | 360/96.5 |
| 5,396,382 | 3/1995 | Murayama | 360/96.5 |

OTHER PUBLICATIONS

Patent Abstracts of Japan, vol. 8, No. 257 (P–316) (1694) 24 Nov. 1984.

Patent Abstracts of Japan, vol. 11, No. 129 (P–570) 23 Apr. 1987.

Patent Abstracts of Japan, vol. 13, No. 129 (P–849) 30 Mar. 1989.

CASSETTE LOADING APPARATUS HAVING A CASSETTE HOLDER AND A PAIR OF SLIDERS WHICH ARE SHORTER THAN THE CASSETTE HOLDER IN ONE DIRECTION

This application is a division of application Ser. No. 08/305,160, filed Sep. 13, 1994, now U.S. Pat. No. 5,493,459 which is a division of application Ser. No. 07/852,730 filed Mar. 17, 1992, now U.S. Pat. No. 5,402,405.

BACKGROUND OF THE INVENTION

1. Field of the Invention

This invention relates to a cassette loading apparatus most suitably applied, for example, to a professional-use video tape recorder of the front loading type, and particularly to a driving system for a cassette holder.

2. Description of the Prior Art

A cassette loading apparatus for a video tape recorder of the front loading type is conventionally arranged so that, as disclosed, for example, in U.S. Pat. No. 4,664,337, a cassette holder having a cassette inserted therein is first drawn in horizontally from a cassette receiving position to an intermediate position and then moved vertically downward to transport the cassette from above to a cassette playing position. Various mechanisms for achieving such movement of the cassette holder are known, including, for example, the mechanism disclosed in U.S. Pat. No. 4,320,424 wherein a plurality of rollers mounted on a cassette holder are guided by L-shaped guides in a pair of guide plates disposed on opposite sides of the path of travel of the cassette holder while L-shaped racks provided integrally on the cassette holder are driven by a pair of pinions mounted on the guide plates. Another example of such mechanisms is disclosed in U.S. Pat. No. 4,933,790 wherein a guide pin of a cassette holder is driven directly by means of a pivotal arm mounted on a guide plate.

In recent years, cassette loading mechanisms for professional-use video tape recorders have required a long operation stroke for the cassette holder, that is, a long horizontal stroke for drawing in a cassette from a cassette receiving position to a cassette playing position so that a cassette of any of a plurality of different sizes (large, medium and small) may be played on the video tape recorder. It is also necessary to retain a cassette of any one of the different sizes in the cassette playing position with a stabilized resilient urging force.

However, in order to achieve an increased stroke for a cassette holder, it is necessary for the conventional cassette loading apparatus as described above to have L-shaped racks with an increased horizontal length or a pivotal arm with an increased length. However, if the horizontal length of the L-shaped rack or the length of the pivotal arm is increased, then the space required for movement of the same may extend significantly beyond the space required for movement of the cassette holder, which will significantly increase the overall size of the cassette loading apparatus. Therefore, it is difficult to achieve a long stroke for the cassette holder. Further, with the conventional cassette loading apparatus described above, the cassette is resiliently urged to the cassette playing position by means of a torque limiter incorporated in the driving system for the pinons or for the pivotal arm. However, since the resiliently urging force upon the cassette varies significantly with a small displacement of the cassette holder at the cassette playing position, it is necessary to effect a fine adjustment of the position of the cassette holder. Moreover, another problem is that a locking mechanism must be provided because, when the cassette is resiliently urged to the cassette playing position, a reactive force from the torque limiter is applied to the driving system.

Cassette loading apparatus for a video tape recorder of the front-loading type are also known which allow observation of how much tape remains to be wound in the cassette being recorded or reproduced by the video tape recorder. For example, one such conventional cassette loading apparatus includes a reflecting mirror supported for pivotal motion around a horizontal axis above the intermediate position of the cassette holder with a movable end of the mirror in contact with the cassette holder. When the cassette holder moves downwardly to the cassette playing position, the reflecting mirror tilts downwardly by its own weight so that it is inclined by 45 degrees or so, in order to reflect an image of the upper face of the cassette from the cassette playing position to the cassette insertion opening. In this way, the amount of tape remaining to be wound can be observed through the insertion opening.

In such cassette loading apparatus, in order to achieve a long operation stroke of the cassette holder as described above, it is necessary to dispose the reflecting mirror at a position that is rather close in the cassette inserting direction to the intermediate position and so is rather distant from the cassette insertion opening.

However, in such conventional loading apparatus, since the pivotal reflecting mirror is supported directly on the cassette holder, it is difficult to dispose the reflecting mirror at a position that is displaced to a great extent in the cassette inserting direction from the cassette receiving position of the cassette holder. Accordingly, even if a long stroke of the cassette holder is achieved, the reflecting mirror must be disposed a position in proximity to the cassette insertion opening, so that the field of view of the upper face of the cassette at the cassette playing position is restricted significantly.

Further, in such a cassette loading apparatus of the type as described just above, a cassette at the cassette playing position is often brightly illuminated from above by a lightbulb provided within the video tape recorder so that the cassette may be observed.

However, the conventional bulb used for internal illumination suffers from a short life and is vulnerable to vibrations, shock and the like.

A light emitting semiconductor device such as an LED (light emitting diode) seems to be an alternative to the bulb for the purpose of internal illumination. However, a light emitting semiconductor device such as an LED emits light in a sharply limited direction and fails to illuminate uniformly, so that an LED is not suitable as an internal illuminating element.

Incidentally, the cassette loading apparatus for a video tape recorder the front-loading type disclosed in U.S. Pat. No. 4,664,337 mentioned hereinabove is designed for use in a broadcasting station and includes a cassette insertion guide for positioning the cassette holder a cassette of any one of a plurality of predetermined sizes. The apparatus also includes a cassette size detecting lever for detecting the size of the cassette in the cassette holder, and a cassette size detecting switch mounted for operation by the cassette size detecting lever. The distance between a pair of reel receivers is automatically adjusted in accordance with the size of the cassette inserted in the cassette holder.

However, this cassette loading apparatus is disadvantageous in that the number of parts and the number of steps required for assembly are great and the cost is high.

Another cassette loading apparatus for a professional-use video tape recorder of the front loading type is disclosed in U.S. Pat. No. 4,631,607 which is commonly assigned with the present patent application.

This cassette loading apparatus also is arranged for transporting a cassette of any one of a plurality of different sizes (large, medium and small) to a cassette playing position. The cassette loading apparatus includes a cassette urging plate of a size sufficient to cover the upper face of a cassette of any one of the different sizes. The cassette urging plate is disposed above and normally biased to contact with the cassette holder by means of a cassette urging spring such that a cassette of any one of the different sizes is inserted between the cassette holder and the cassette urging plate against frictional resistance exerted by the biasing force of the cassette urging spring. When the cassette holder is drawn in horizontally from the cassette receiving position to the intermediate position with the cassette inserted between the cassette holder and the cassette urging plate, the cassette slides on the cassette urging plate, and then when the cassette holder is moved vertically downward to the cassette playing position to load the cassette from above to the cassette playing position, the cassette urging plate is resiliently urged downwardly by the cassette urging spring. Thus, the cassette at the cassette playing position is resiliently urged from above to the cassette playing position by the cassette urging plate.

In this cassette loading apparatus, however, since the single cassette urging plate is used commonly for cassettes of different sizes, if the cassette urging force by the cassette urging plate is set so as to resiliently urge the small cassette with a suitable resilient force, then the resiliently urging force will be insufficient for the large cassette. Accordingly, the cassette urging force by the cassette urging plate must be set so as to assure a sufficient resiliently urging force for the large cassette.

When the cassette resiliently urging force is set for a cassette of the large size, a correspondingly great cassette inserting force is required when a cassette of any one of the different sizes is inserted between the cassette holder and the cassette urging plate, and insertion of a cassette may possibly be difficult. Further, when a cassette is inserted or when the cassette holder is drawn in horizontally, the cassette is rubbed against the cassette urging plate with a great force, and the cassette is liable to be scraped. Further, due to warping or the like of the cassette urging plate or of the cassette, a stabilized cassette urging force cannot be obtained that is appropriate to the size of the cassette inserted.

SUMMARY OF THE INVENTION

It is the object of the present invention to provide a cassette loading apparatus wherein a cassette holder has a long operating stroke and can be positioned readily and accurately at the cassette playing position.

It is another object of the present invention to provide a cassette loading apparatus wherein a reflecting mirror can be disposed at an ideal position with respect to a cassette holder with a long operation stroke.

It is a further object of the present invention to provide a cassette loading apparatus wherein an upper face of a cassette loaded at a cassette playing position can be internally illuminated uniformly making use of a light emitting semiconductor device such as an LED.

It is a still further object of the present invention to provide a cassette loading apparatus wherein a cassette insertion guide can serve also as a cassette size detecting lever.

It is yet a further objective of the present invention to provide a cassette loading apparatus wherein a cassette of any one of a plurality of different sizes can be inserted in a cassette holder with a small force and can be resiliently retained in a well-balanced condition in a cassette playing position.

In order to attain the objects, according to an aspect of the present invention, there is provided a cassette loading apparatus for transporting a tape cassette inserted through an insertion opening to a playing position, which comprises a holder for receiving a tape cassette thereon, a plurality of guide pins provided on the opposite side faces of the holder, a pair of side plates each having a plurality of L-shaped guides each having a horizontal guide position for guiding at least one of the guide pins in a horizontal direction so that a tape cassette received on the holder may be horizontally drawn in and a vertical guide portion for guiding at least one of the guide pins in a vertical direction to move the holder drawn in under the guidance of the horizontal guide portion to the playing position, a pair of sliders each having an inclined guide which is inclined with respect to the horizontal guide portions and vertical guide portions of the L-shaped guides, driving means for driving the sliders in a horizontal direction with respect to the horizontal guide portions of the L-shaped guides, and a pair of engaging elements provided on the opposite side faces of the holder for engaging with the inclined guides of the sliders to transmit a driving force transmitted to the sliders from the driving means to the holder, wherein the holder is moved in a horizontal direction integrally with the sliders by a driving force from the driving means until the guide pins reach end portions of the horizontal guide portions of the L-shaped guides and then the engaging elements move, upon further movement of the sliders in the horizontal direction, downwardly along the inclined guides of the sliders while the holder is moved downwardly under the guidance of the vertical guide portions of the L-shaped guides to load a tape cassette in the holder to the playing position.

With this cassette loading apparatus, a long operation stroke of the cassette holder can readily be achieved in order to cope with cassettes of different sizes by increasing only the length of the stroke of movement of the slider. Moreover, even if the stroke of movement of the slider is increased, the space required for movement of the slider will not extend significantly beyond the space required for movement of the cassette holder.

According to another aspect of the present invention, there is provided a cassette loading apparatus for transporting a tape cassette from one of at least two different specific large and small sizes selectively inserted through an insertion opening to a playing position, which comprises a holder for receiving a tape cassette of any of the different specific sizes thereon such that a center line of the tape cassette in a widthwise direction may be positioned at the center of the holder, first resiliently urging means disposed above the holder for resiliently pressing against a substantially mid portion of a tape cassette of the small size on the holder in a depthwise direction, and a pair of second resiliently urging means disposed above the holder for resiliently pressing against portions of an upper face of a tape cassette of the large size on the holder adjacent the insertion opening, the second resiliently urging means being outboard from the opposite widthwise ends of a tape cassette of the small cassette when the tape cassette of the small size is received on the holder.

With this cassette loading apparatus, a small size cassette is resiliently pressed from above to be retained in the cassette playing position only by the first resiliently urging means. On the other hand, a cassette of the large size is resiliently pressed at two locations thereof spaced from each other by both of the first and second resiliently urging means. Accordingly a cassette of any of the different sizes can be resiliently pressed with a high degree of accuracy in a well-balanced condition by stabilized cassette urging forces without being influenced by warping of the cassette.

Further, since the cassette urging force for a cassette of the large size is shared by the first and second resiliently urging means, the cassette urging force of the first resiliently urging means can be made weak, and since only the first resiliently urging means having the weak cassette urging force is provided on the cassette holder, the inserting force when a cassette of any of the different sizes is selectively inserted into the cassette holder can be made small. Accordingly, insertion of a cassette of any of the different sizes into the cassette holder can always be readily performed and scraping of the cassette upon insertion thereof can for the most part be prevented.

According to a further aspect of the present invention, there is provided a cassette loading apparatus, which comprises a cassette holder mounted for movement between a cassette receiving position at which a tape cassette inserted through an insertion opening is received and a playing position at which the tape cassette is played, a reflecting mirror disposed above the holder for allowing an upper face of the tape cassette at the playing position to be visually observed through the insertion opening, and a plurality of cassette illuminating light emitting diodes disposed in a row along a longitudinal direction of the reflecting mirror such that rays of light emitted therefrom may first be reflected by the reflecting mirror and then illuminate an upper face of the tape cassette on the cassette holder at the playing position.

With this cassette loading apparatus, light from the light emitting diodes is reflected by the reflecting mirror so as to illuminate from above a cassette located at the cassette playing position. Accordingly, a sufficiently long path of light can be assured between the light emitting diodes and the upper face of the cassette located at the cassette playing position, so that the light from the light emitting diodes can be dispersed sufficiently by the reflecting mirror to illuminate the upper face of the cassette uniformly and brightly. Also, since light emitting diodes are resistant to vibration, shock and so forth and have a long life compared to a bulb, the reliability and durability of the cassette loading apparatus is improved.

According to a still further aspect of the present invention, there is provided a cassette loading apparatus for transporting a tape cassette of one of at least two different specific large and small sizes selectively inserted through an insertion opening to a playing position, which comprises a holder having a width corresponding to the width of a tape cassette of the large size for receiving a tape cassette of any of the sizes thereon, a pair of cassette guides molded from a synthetic resin and provided on an inner face of the holder, each of the cassette guides having an inner face portion for guiding a corresponding one of the opposite side faces of a tape cassette of the small size such that a center line of the tape cassette of the small size in its widthwise direction may be positioned at the center of the holder in its widthwise direction, each of the cassette guides having an upper face portion formed such that, when a tape cassette of the large size is received by the holder, the cassette guide is covered by a corresponding one of a pair of grooved portions provided on the bottom of the tape cassette of the large size, a resilient arm provided integrally on the upper face portion of one of the cassette guides such that, when a tape cassette of the large size is inserted onto the holder, the resilient arm is pressed and resiliently deformed by the tape cassette of the large size, and detecting means for detecting deformation of the resilient arm to detect that a tape cassette of the large size has been inserted onto the holder.

With this cassette loading apparatus, the detecting means detects deformation of the resilient arm which is provided integrally on the upper face portion of the one cassette guide to detect the size of a tape cassette received on the holder. Thus the cassette guide also serves as a cassette size detecting lever, and accordingly, the number of parts and the number of steps for assembly of the cassette loading apparatus can be reduced to achieve reduction in cost. Further, since the cassette guides can be mounted accurately on the holder, the cassette size detecting lever can also be accurately located and detection of cassette size can be performed with improved reliability.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

A cassette loading apparatus to which the present invention is applied is incorporated in a professional-use video tape recorder of the front loading type and has five new features. The five new features of the cassette loading apparatus will be described initially.

First Feature

Figure 1:
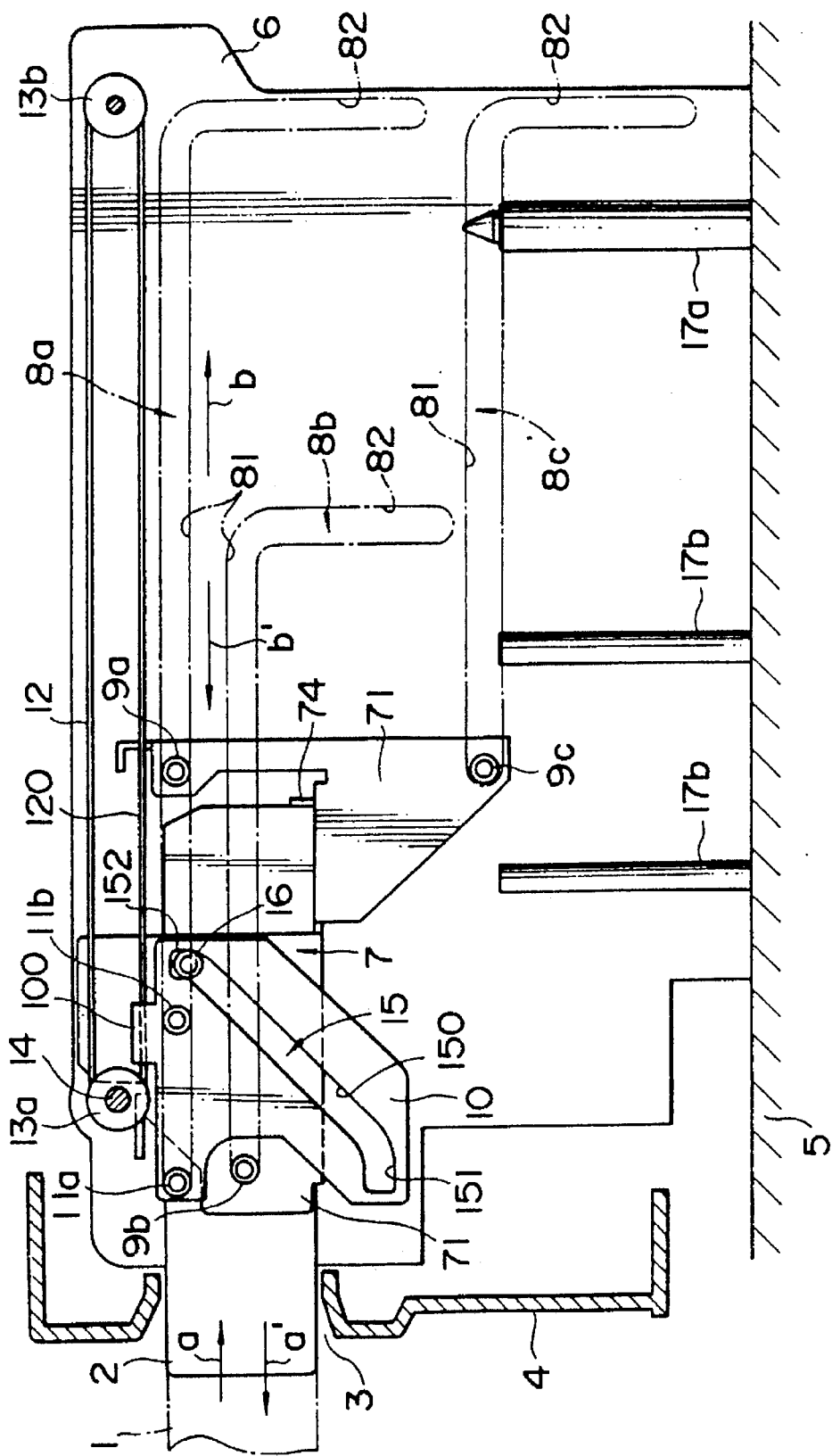
FIG. 1 is a side elevational view, partly in section, of a cassette loading apparatus according to a preferred embodiment of the present invention showing a first feature with a cassette being inserted in a cassette holder.
Figure 2:
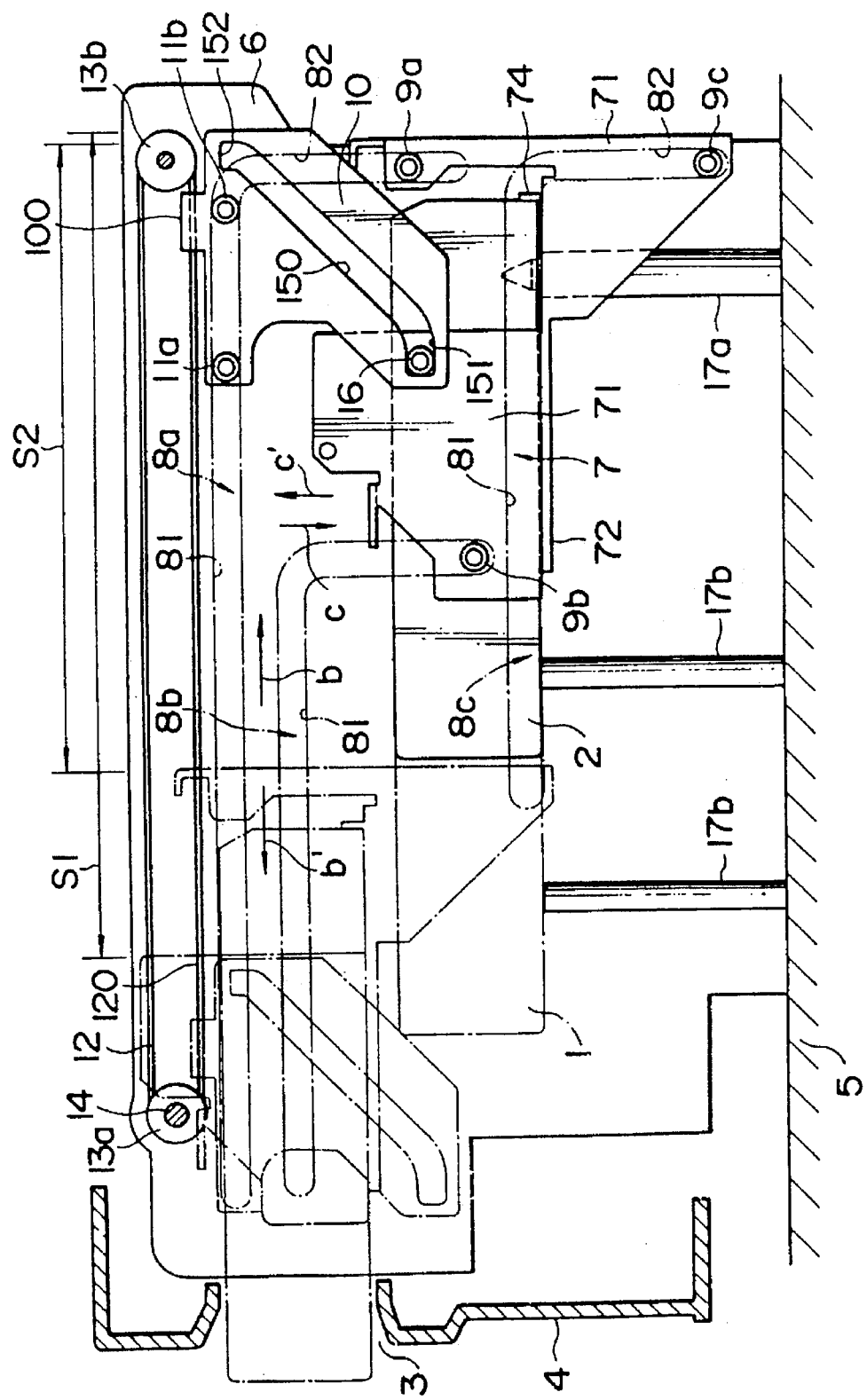
FIG. 2 is a similar view but showing the first feature of a cassette loading apparatus when a cassette is positioned at a cassette playing position.

Referring first to FIGS. 1 and 2, the cassette loading apparatus is arranged for selectively loading a cassette of either one of two different specific sizes, that is, a large cassette 1 or a small cassette 2. Alternatively, the apparatus may be arranged for selectively loading a cassette of any one of three (large, medium or small) or more different specific sizes. A pair of left and right guide plates 6 are provided vertically on a horizontal chassis 5 rearwardly of a front panel 4 of the video tape recorder in which a cassette insertion opening 3 is formed. A cassette holder 7 is disposed horizontally between the left and right guide plates 6.

The cassette holder 7 is disposed for movement between a cassette receiving position shown in FIG. 1 in which a cassette can be selectively inserted horizontally in the direction indicated by an arrow mark a into the cassette holder 7 and a cassette playing position shown in FIG. 2 in which the cassette inserted in the cassette holder 7 is recorded or reproduced by the video tape recorder. The cassette holder 7 is moved between the cassette receiving and cassette playing positions by way of an intermediate position.

Each of the left and right guide plates 6 has three L-shaped guides 8a, 8b and 8c in the form of guideways formed therein. Each of the L-shaped guides 8a, 8b and 8c has a horizontal first guide portion 81 and a vertical second guide portion 82 connected perpendicularly to each other. Three guide rollers 9a, 9b and 9c are mounted for rotation on an outer face of each of a pair of left and right side plates 71 of the cassette holder 7. The guide rollers 9a, 9b and 9c of the cassette holder 7 are received in the L-shaped guides 8a, 8b and 8c, respectively, in the guide plates 6. The rollers 9a, 9b and 9c are guided by the guides 8a, 8b and 8c so that the cassette holder 7 is first drawn in horizontally in the direction indicated by an arrow mark b from the cassette receiving position to the intermediate position and then moved vertically downwardly in the direction indicated by an arrow mark c to the cassette playing position.

A pair of left and right vertical sliders 10 are disposed on the outer faces of the left and right side plates 71 of the cassette holder 7 and each has a pair of guide rollers 11a and 11b mounted for rotation thereon. The guide rollers 11a and 11b of the sliders 10 are fitted in the first guide portions 81 of the uppermost L-shaped guides 8a of the guide plates 6 so that the sliders 10 move horizontally in the direction indicated by the arrow mark b or b' between the cassette receiving position and the intermediate position above the cassette playing position under the guidance of the first guide portions 81 of the L-shaped guides 8a.

A pair of left and right timing belts 12 serving as driving means extend horizontally for circulation each between a pair of timing pulleys 13a and 13b mounted on the inner face of each of the left and right guide plates 6. Lower spans 120 of the timing belts 12 are partially fixed to belt fixing tabs 100 provided at upper ends of the left and right sliders 10, and the left and right timing pulleys 13a adjacent the cassette insertion opening 3 are driven to rotate integrally by a drive shaft 14.

An inclined guide 15 in the form of a guideway is formed in each of the left and right sliders 10 in an inclined relationship of 45 degrees with respect to both of the first guide portions 81 and second guide portions 82 of the L-shaped guides 8a. A pair of left and right guide rollers 16 are mounted for rotation on the outer faces of the left and right side plates 71 of the cassette holder 7 and fitted in the inclined guides 15 for guidance by the inclined guides 15.

The left and right inclined guides 15 are formed to extend horizontally at lower end portions 151 thereof such that they make a right angle with respect to the second guide portions 82 of the L-shaped guides 8a. The left and right inclined guides 15 are further formed to extend vertically at upper end portions 152 thereof such that they make a right angle with respect to the first angle portions 81 of the L-shaped guides 8a.

When a cassette is to be positioned in the cassette playing position, first the large or small cassette 1 or 2 is selectively inserted horizontally in the direction of the arrow mark a through the cassette insertion opening 3 into the cassette holder 7 located at the cassette receiving position as shown in FIG. 1. Then the left and right timing pulleys 13a are driven to rotate forwardly by the drive shaft 14 to circulate the left and right timing belts 12 simultaneously in the direction of arrow mark b. Consequently, the left and right sliders 10 connected to the timing belts 12 are simultaneously moved horizontally in the direction of the arrow mark b while the guide rollers 11a and 11b thereon are guided by the first guide portions 81 of the L-shaped guides 8a provided in the guide plates 6. As a result, the left and right guide rollers 16 of the cassette holder 7 are pushed to move in the direction of the arrow mark b by the vertical upper ends 152 of the inclined guides 15 provided in the sliders 10 so that the cassette holder 7 is drawn in horizontally in the direction of the arrow mark b from the cassette receiving position shown in FIG. 1 to the intermediate position with the guide rollers 9a, 9b and 9c thereof being guided by the first guide portions 81 of the L-shaped guide portions 8a, 8b and 8c, respectively. Then, when the guide rollers 9a, 9b and 9c advance into the second guide portions 82 of the L-shaped guides 8a, 8b and 8c, respectively, the left and right guide rollers 16 will be dropped into the inclined portions 150 from the upper ends 152 of the inclined guides 15 by the weight of the cassette holder 7. After that, the guide rollers 16 are moved down along the inclined portions 150 of the inclined guides 15 by the weight of the cassette holder 7 and by a guiding action of the inclined guides 15. Then, while the guide rollers 9a, 9b and 9c are guided by the second guide portions 82 of the L-shaped guides 8a, 8b and 8c, respectively, the cassette holder 7 is moved vertically downwardly in the direction of the arrow mark c to the cassette playing position shown in FIG. 2. Thereupon, as shown in FIG. 2, the large or small cassette 1 or 2 is loaded from above onto a plurality of height reference pins 17a which serve also as positioning pins and selectively onto two pairs of height reference pins 17b provided on the chassis 5 while the guide rollers 16 advance into the horizontal lower ends 151 of the inclined guides 15 so that the cassette holder 7 is mechanically and automatically locked at the cassette playing position.

It is to be noted that, when the cassette is to be unloaded, the left and right timing belts 12 are driven to circulate in the reverse direction indicated by the arrow mark b so that, by operations of the associated elements that are the reverse of those described above, the cassette holder 7 is first moved vertically upwardly in the direction indicated by an arrow mark c' from the cassette playing position shown in FIG. 2 to the intermediate position and then moved horizontally back in the direction of the arrow mark b' to the cassette receiving position shown in FIG. 1 until the large or small cassette 1 or 2 is discharged in the direction of the arrow mark a' outwardly from the cassette insertion opening 3.

With the first feature described above, a long operation stroke of the cassette holder 7 can be readily achieved by increasing only the horizontal stroke S1 (FIG. 2) of the sliders 10. Moreover, the space required for horizontal movement of the sliders 10 can almost be accommodated in the space for horizontal movement of the cassette holder 7. Therefore, even if the stroke S1 of the sliders 10 is increased, the space for movement of the sliders 10 will not project much beyond the space for movement of the cassette holder 7.

Further, the cassette holder 7 can be mechanically positioned and locked readily and accurately at the cassette playing position by the lower ends 151 of the inclined guides 15 provided in the sliders 10.

Second Feature

Figure 3:
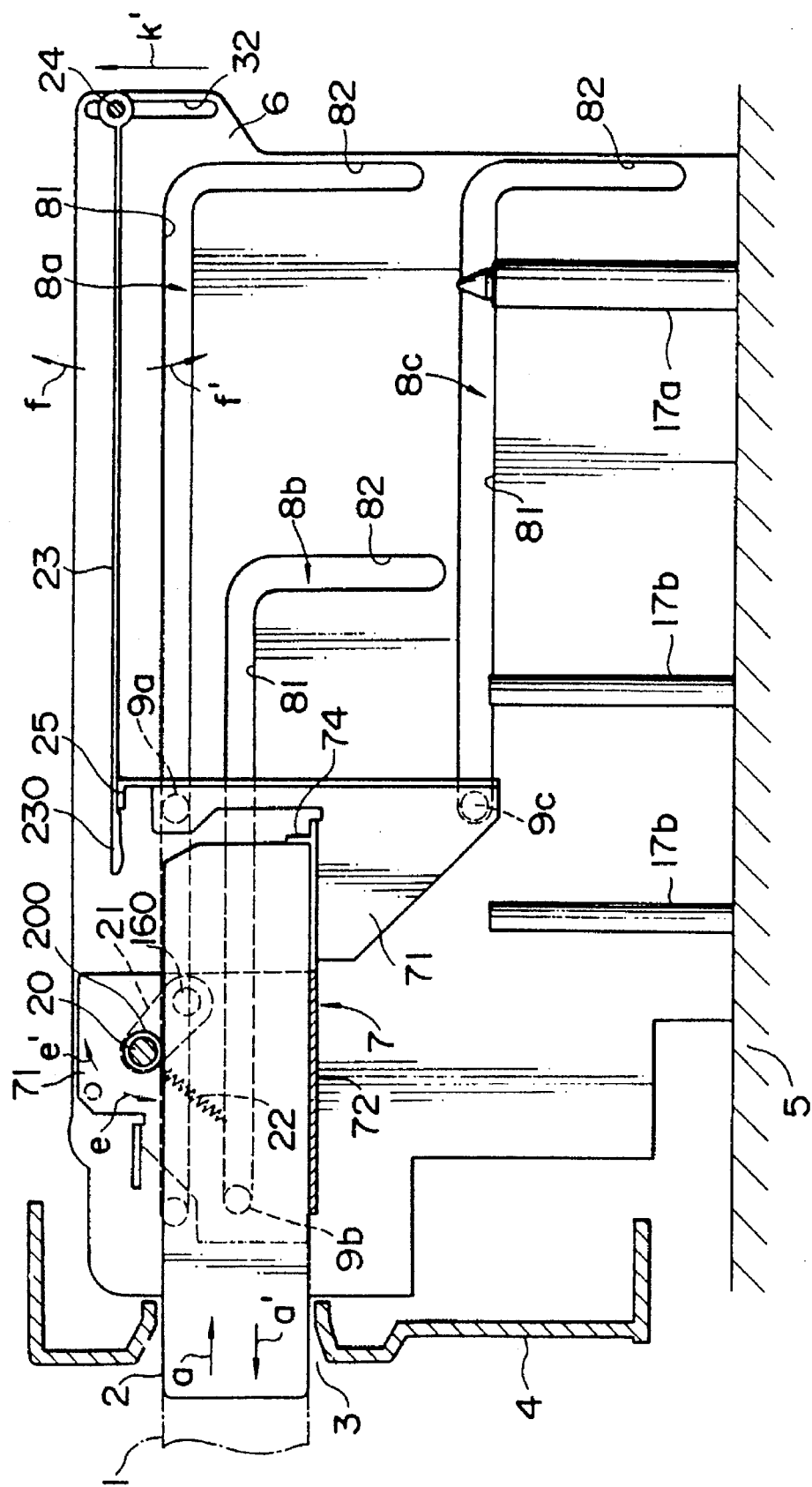
FIG. 3 is a similar view but showing a second feature of the cassette loading apparatus with a cassette being inserted in the cassette holder.
Figure 4:
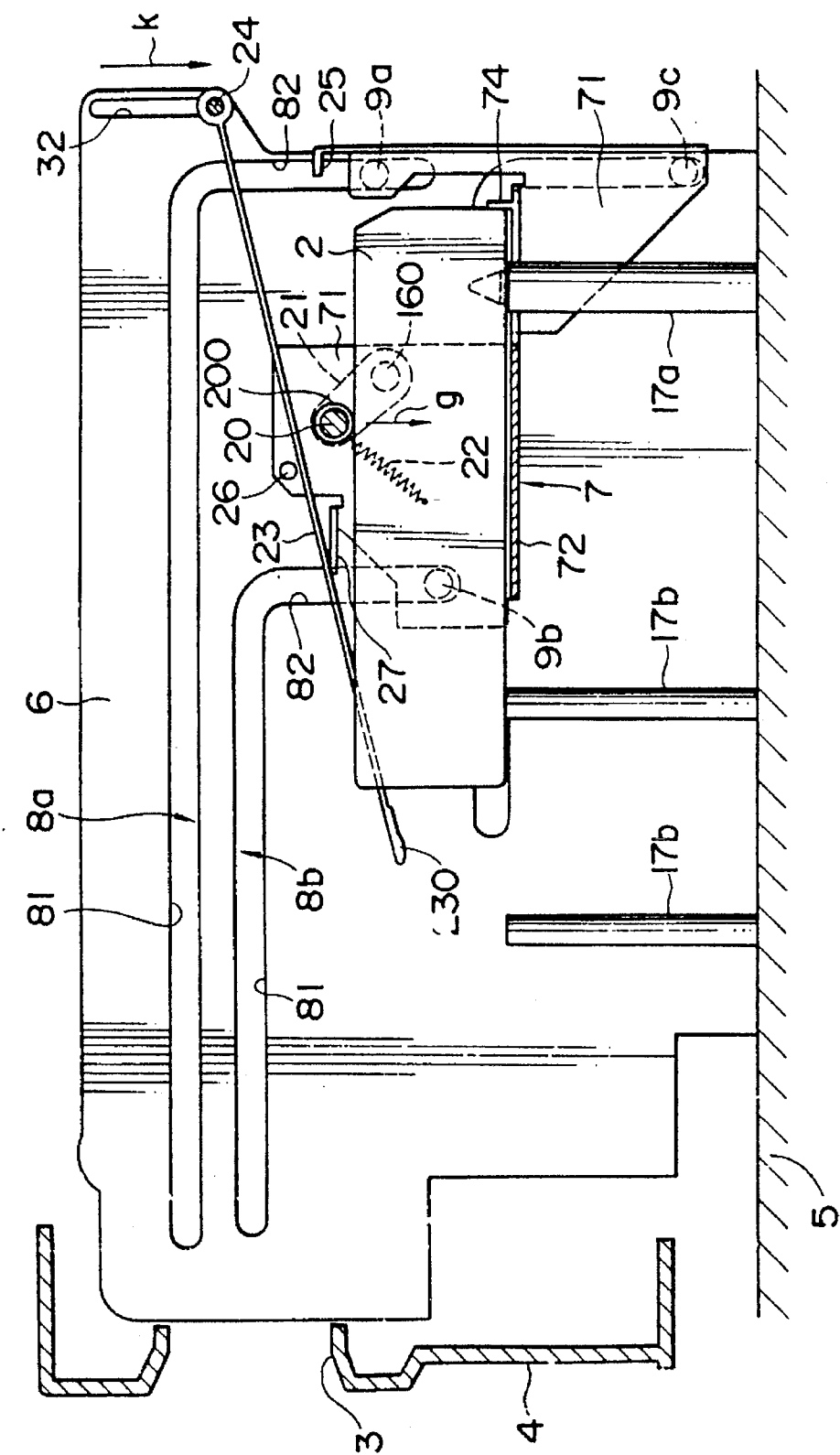
FIG. 4 is a similar view but showing the second feature of the cassette loading apparatus when a small cassette is positioned at the cassette playing position.
Figure 5:
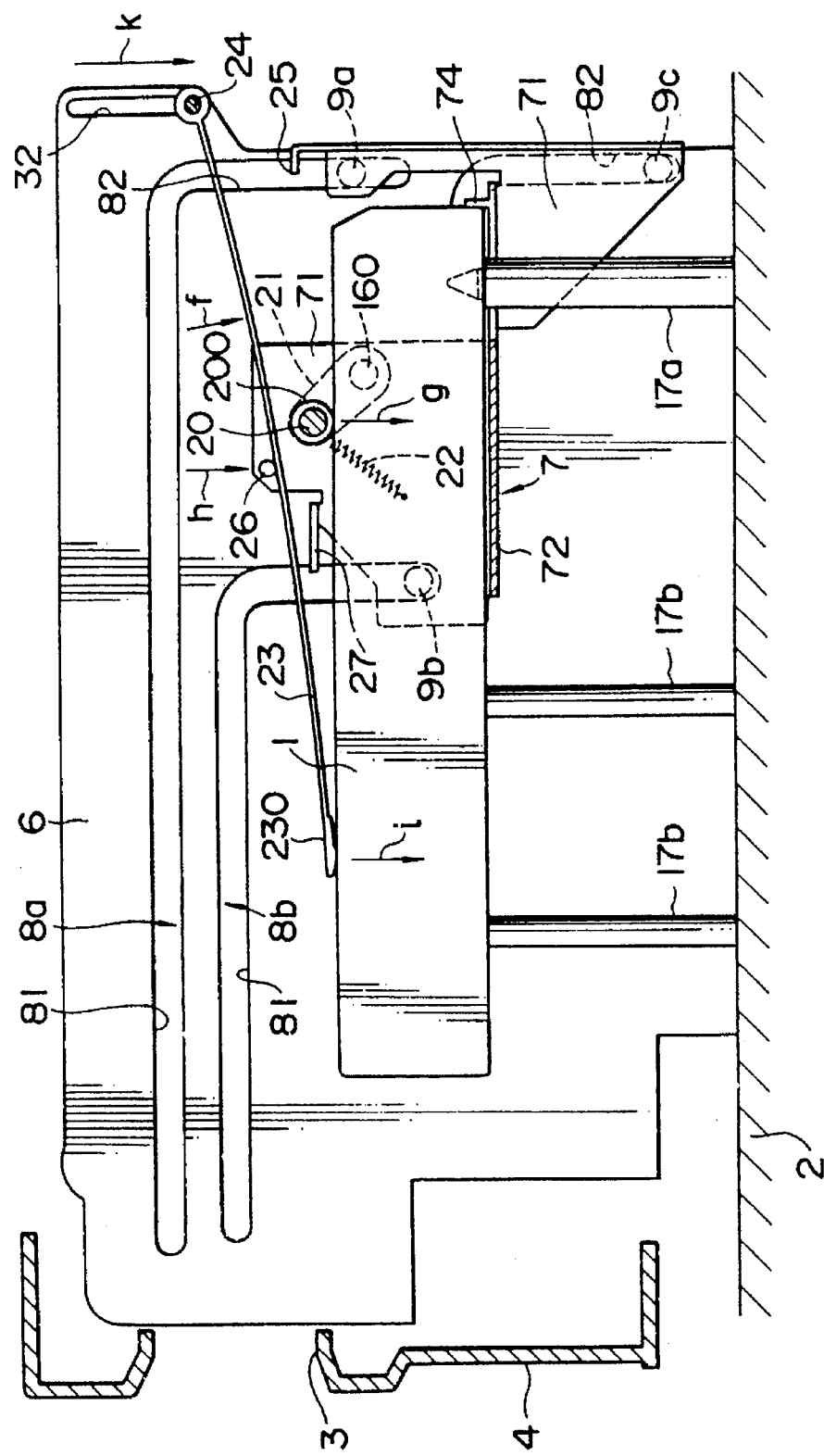
FIG. 5 is a similar view but showing the second feature of the cassette loading apparatus when a large cassette is positioned at the cassette playing position.

The second feature of the cassette loading apparatus according to the present invention is shown in detail in FIGS. 3 to 5. Referring to FIGS. 3 to 5, a resiliently urging shaft 20 is disposed horizontally above the cassette holder 7 and serves as resiliently urging means for cassettes of both the large and small sizes. The resiliently urging shaft 20 is supported at the opposite left and right ends thereof on the left and right side plates 71 of the cassette holder 7 by way of a pair of left and right supporting levers 21, respectively, for lateral bodily movement in the opposite upward and downward directions indicated by arrow marks e and e'. The resiliently urging shaft 20 is normally biased in the downward direction of the arrow mark e by a pair of left and right urging springs 22 in the form of tension coil springs.

A pair of left and right resiliently urging arms 23 are disposed above the intermediate position which is above the cassette playing position. The resiliently urging arms 23 serve as resiliently urging means only for a large cassette and are each formed from a leaf spring. The resiliently urging arms 23 are mounted for pivotal motion on a horizontal fulcrum shaft 24 mounted at the opposite ends thereof at rear portions of the left and right guide plates 6. The resiliently urging arms 23 extend forwardly toward the cassette insertion opening 3 of the front panel 4 and are integrally pivoted, when the fulcrum shaft 24 is angularly rotated about its axis, in the upward or downward direction indicated by an arrow mark f or f'.

When the cassette holder 7 is at the cassette receiving position as shown in FIG. 3, forward movable or free ends 230 of the resiliently urging arms 23 in the unloading direction of the arrow mark a' are supported against resilient forces thereof by a pair of left and right horizontal supporting tabs 25 formed at upper ends of rear end portions of the left and right side plates 71 of the cassette holder 7 in the cassette inserting direction of the arrow mark a. Accordingly, when the large or small cassette 1 or 2 is selectively inserted into the cassette holder 7 in the direction of the arrow mark a through the cassette inserting opening 3, only the resiliently urging shaft 20 is pushed up by an inclined upper end face of the large or small cassette 1 or 2 against the urging springs 22 and the large or small cassette 1 or 2 is pressed against and held on the bottom plate 72 of the cassette holder 7.

Then, when the small cassette 2 is moved to the cassette playing position by the cassette holder 7 as shown in FIG. 4, it is resiliently pressed in the downward direction indicated by an arrow mark g against the height reference pins 17a and 17b only by the resiliently urging shaft 20. In this instance, the resiliently urging shaft 20 resiliently presses in a well balanced condition in the direction of the arrow mark g against a substantially central portion of the small cassette 2 in the cassette inserting direction.

On the other hand, when the large cassette 1 is moved to the cassette playing position by the cassette holder 7 as shown in FIG. 5, the opposite left and right end portions of the large cassette 1 advance to positions below the movable ends 230 of the left and right resiliently urging arms 23 while a pair of left and right resiliently urging pins 26 extending horizontally inward from upper end portions of the inner faces of the left and right side plates 71 of the cassette holder 7 press in the downward direction indicated by an arrow mark h against substantially central portions of the left and right resiliently urging arms 23 in the longitudinal direction to urge the left and right resiliently urging arms 23 to pivot in the direction of the arrow mark f. As a result, the large cassette is resiliently pressed from above, at locations at the opposite left and right end portions thereof displaced forwardly in the cassette unloading direction of the arrow mark a', in the direction indicated by an arrow mark i by the movable ends 230 at the left and right resiliently urging arms 23, and it is also resiliently pressed from above at a location thereof displaced in the cassette inserting direction of the arrow mark a, in the direction of the arrow mark g by the resiliently urging shaft 20. Consequently, the large cassette 1 is resiliently pressed in a well balanced condition against the height reference pins 17a and 17b.

With the second feature having the construction as described above, whichever one of the large and small cassettes 1 and 2 is transported to the cassette playing position, it is resiliently pressed in a well balanced condition against the height reference pins 17a and 17b. Further, since the force to resiliently press the large cassette 1 is shared by the resiliently urging shaft 20 and the left and right resiliently urging arms 23, the cassette urging force of the resiliently urging shaft 20 can be reduced to a suitable level for pressing the small cassette 2. Accordingly, the cassette inserting force when the large or small cassette 1 or 2 is selectively inserted into the cassette holder 7 in the direction of the arrow mark a through the cassette insertion opening 3 can be reduced, thereby reducing the possibility of scraping the large or small cassette 1 or 2 by friction between the large or small cassette 1 or 2 and the resiliently urging shaft 20.

Third Feature

Figure 6:
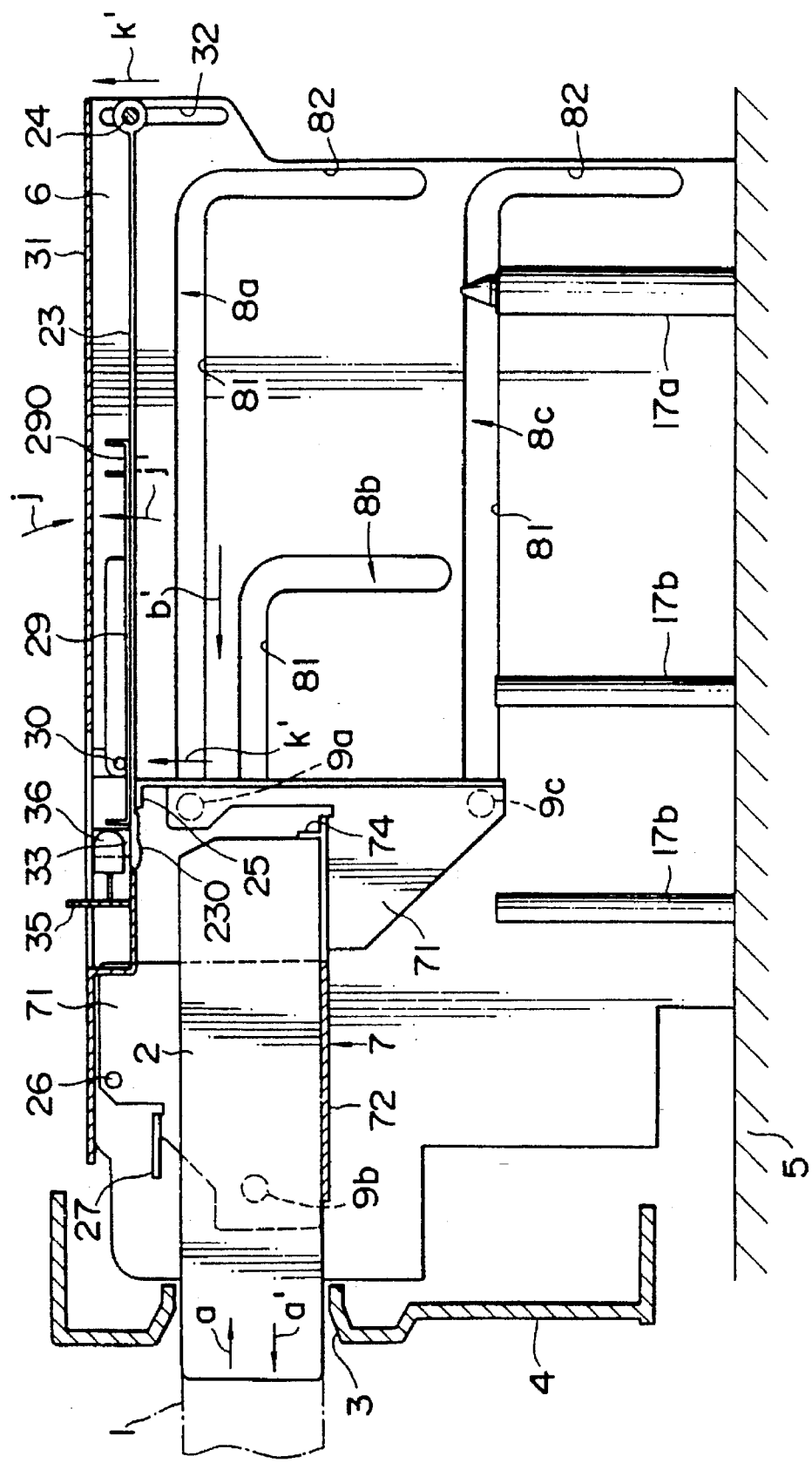
FIG. 6 is a similar view but showing a third feature of the cassette loading apparatus when a cassette is being inserted in the cassette holder.
Figure 7:
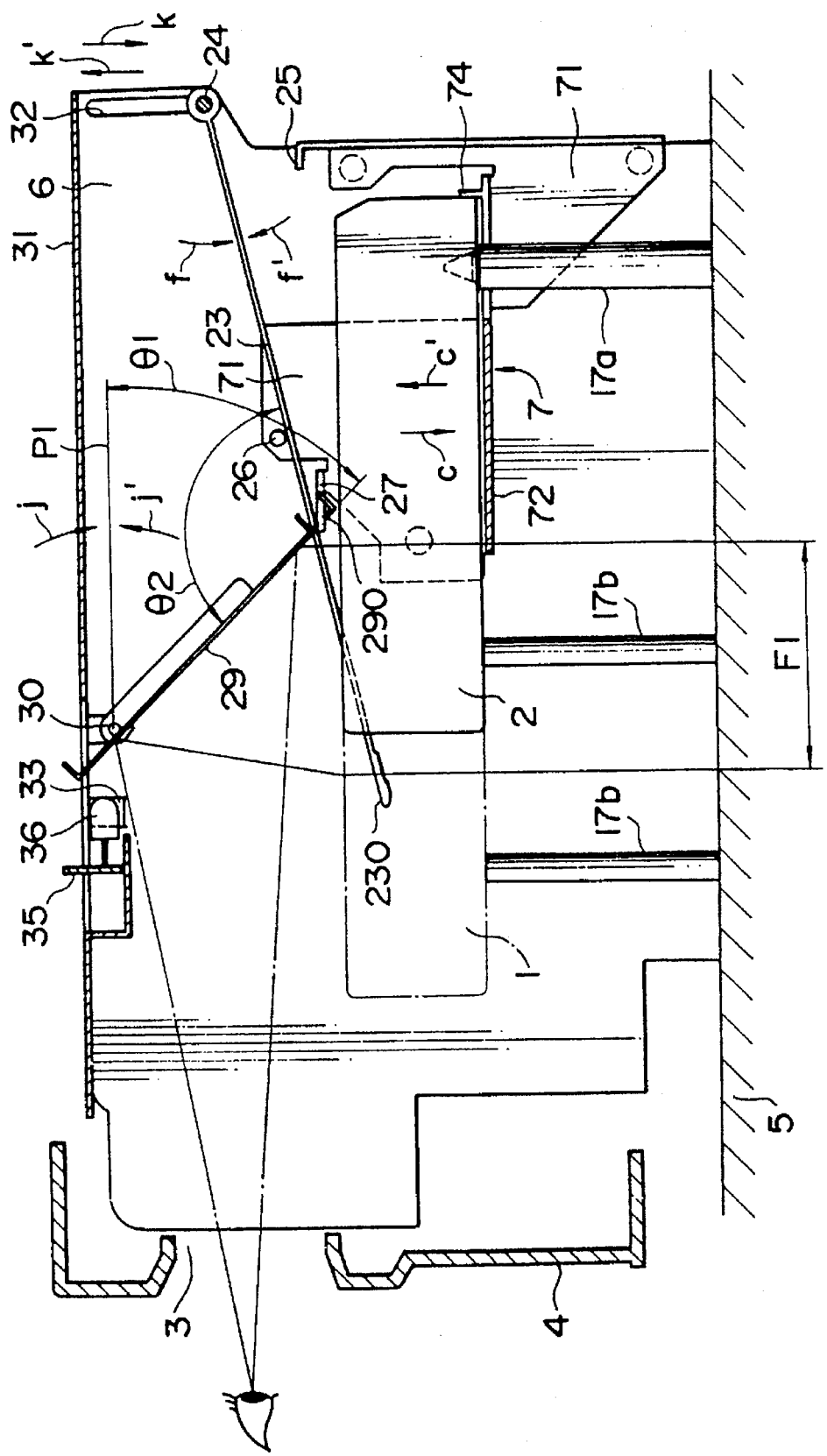
FIG. 7 is a similar view but showing the third feature of the cassette loading apparatus when a cassette is positioned at the cassette playing position.

The third feature of the cassette loading apparatus according to the present invention is shown in detail in FIGS. 6 and 7. Referring first to FIG. 6, a reflecting mirror 29 is disposed at a position displaced by a great distance in the cassette inserting direction indicated by the arrow mark a from the cassette holder 7 at the cassette receiving position as shown in FIG. 6. The reflecting mirror 29 is supported at end portions thereof in the cassette unloading direction indicated by the arrow mark a' for pivotal motion in the upward and downward directions indicated by arrow marks j and j' on an upper cover 31 by way of a pair of left and right horizontal fulcrum shafts 30 serving as a first fulcrum. The upper cover 31 is mounted horizontally on and extends between the left and right guide plates 6. The reflecting mirror 29 may be formed from a metal plate such as a stainless steel plate having a polished mirror face.

The left and right resiliently urging arms 23 serve also as reflecting mirror supporting arms, and movable end portions 290 at the opposite left and right end portions of the reflecting mirror 29 in the cassette inserting direction of the arrow mark a are supported by upper faces of the resiliently urging arms 23.

The horizontal fulcrum shaft 24 is secured to base ends of the resiliently urging arms 23 in the cassette inserting direction of the arrow mark a as described hereinabove and serves as a second fulcrum. The fulcrum shaft 24 is fitted at the opposite left and right ends thereof for movement in the upward and downward directions indicated by arrow marks k and k' in a pair of elongated holes 32 formed in the left and right guide plates 6, respectively, and extending in the upward and downward directions.

When the cassette holder 7 is at the cassette receiving position as shown in FIG. 6, the left and right supporting tabs 25 of the cassette holder 7 support the movable ends 230 of the left and right resiliently urging arms 23 from below such that the movable ends 230 resiliently contact with and are held by a pair of contacting tabs 33 formed at lower portions of the opposite left and right end portions of the upper cover 31. As a result, the resiliently urging arms 23 are held so as to extend horizontally in the direction of the arrow mark k' and the reflecting mirror 29 is supported so as to extend horizontally in the direction of the arrow mark k' by the resiliently urging arms 23.

Then, when the large or small cassette 1 or 2 is moved to the cassette playing position by the cassette holder 7 as shown in FIG. 7, the left and right resiliently urging arms 23 are pressed downwardly during downward movement of the cassette holder 7 in the direction of the arrow mark c, by the left and right resiliently urging pins 26, respectively, of the cassette holder 7. Consequently, the fulcrum shaft 24 for the resiliently urging arms 23 are moved down in the direction of the arrow mark k along the elongated holes 32 while the left and right resiliently urging arms 23 are pivoted a little in the direction of the arrow mark f around the fulcrum shaft 24. As a result, the reflecting mirror 29 is pivoted in the direction of the arrow mark j around the fulcrum shafts 30 by its own weight to an inclined position in which it is inclined by an angle e1 smaller than 45 degrees with respect to a horizontal reference line P1, and an image of the upper face of the large or small cassette 1 or 2 loaded at the cassette playing position is reflected to the cassette insertion opening 3 by the reflecting mirror 29. Accordingly the operator can readily observe through the cassette insertion opening 3 how much tape remains unwound or the like concerning the large or small cassette 1 or 2.

With the third feature having the construction as described above, the reflecting mirror 29 can be disposed at an ideal position along the long stroke of the cassette holder 7 without being influenced by the cassette receiving position of the cassette holder 7. This is possible because, when the cassette holder is successively moved in the directions of the arrow marks a and b from the cassette receiving position to the cassette playing position by way of the intermediate position, the reflecting mirror 29 is allowed to be pivoted in the downward direction of the arrow mark j by means of the left and right resiliently urging arms 23 which serve also as reflecting mirror supporting arms. Accordingly, a very wide and good field F1 of view can be assured for the upper face of the large or small cassette 1 or 2 which can be observed through the cassette insertion opening 3.

Further, since the left and right resiliently urging arms 23 are pivoted in the direction of the arrow mark f while the fulcrum shaft 24 for the resiliently urging arms 23 is moved down in the direction of the arrow mark k, the maximum opening angle e2 between the reflecting mirror 29 and the left and right resiliently urging arms 23, which are pivoted in the opposite directions (directions of the arrow marks j and f) relative to each other, can be maintained at an obtuse angle. As a result, the motion for lifting the cassette holder 7 vertically in the direction of the arrow mark c' from the cassette playing position shown in FIG. 7 can be performed smoothly for pushing up the left and right resiliently urging arms 23 in the direction of the arrow mark k' while pivoting the left and right resiliently urging arms 23 in the direction of the arrow mark f' by the left and right supporting portions 25 thereby to push up the movable end 290 of the reflecting mirror 29 in the direction of the arrow mark j' by the left and right resiliently urging arms 23 to fold the reflecting mirror 29 upwardly to the horizontal position as described hereinbefore.

Fourth Feature

Figure 8:
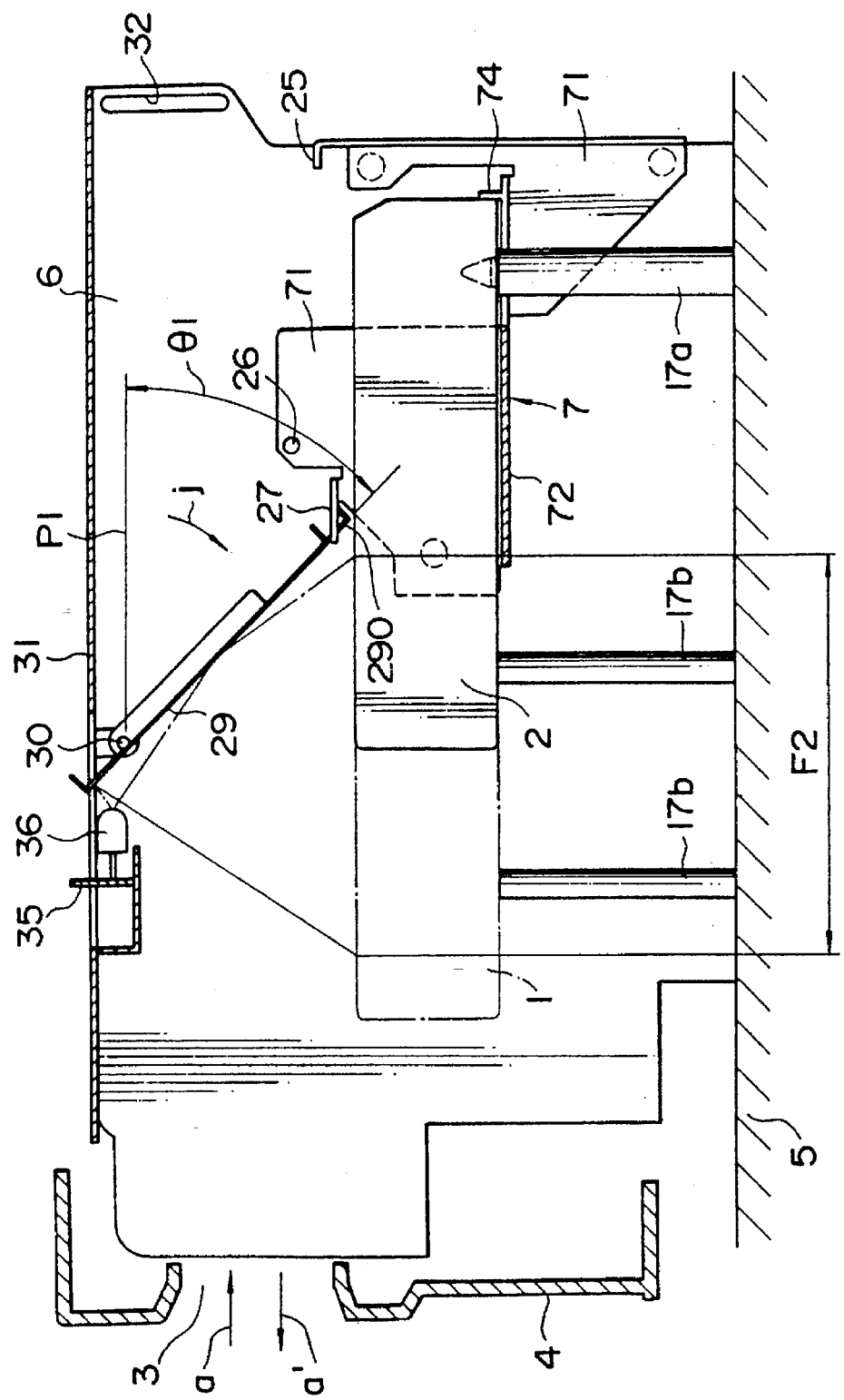
FIG. 8 is a similar view but showing illumination of a cassette positioned at the cassette playing position according to a fourth feature.
Figure 9:
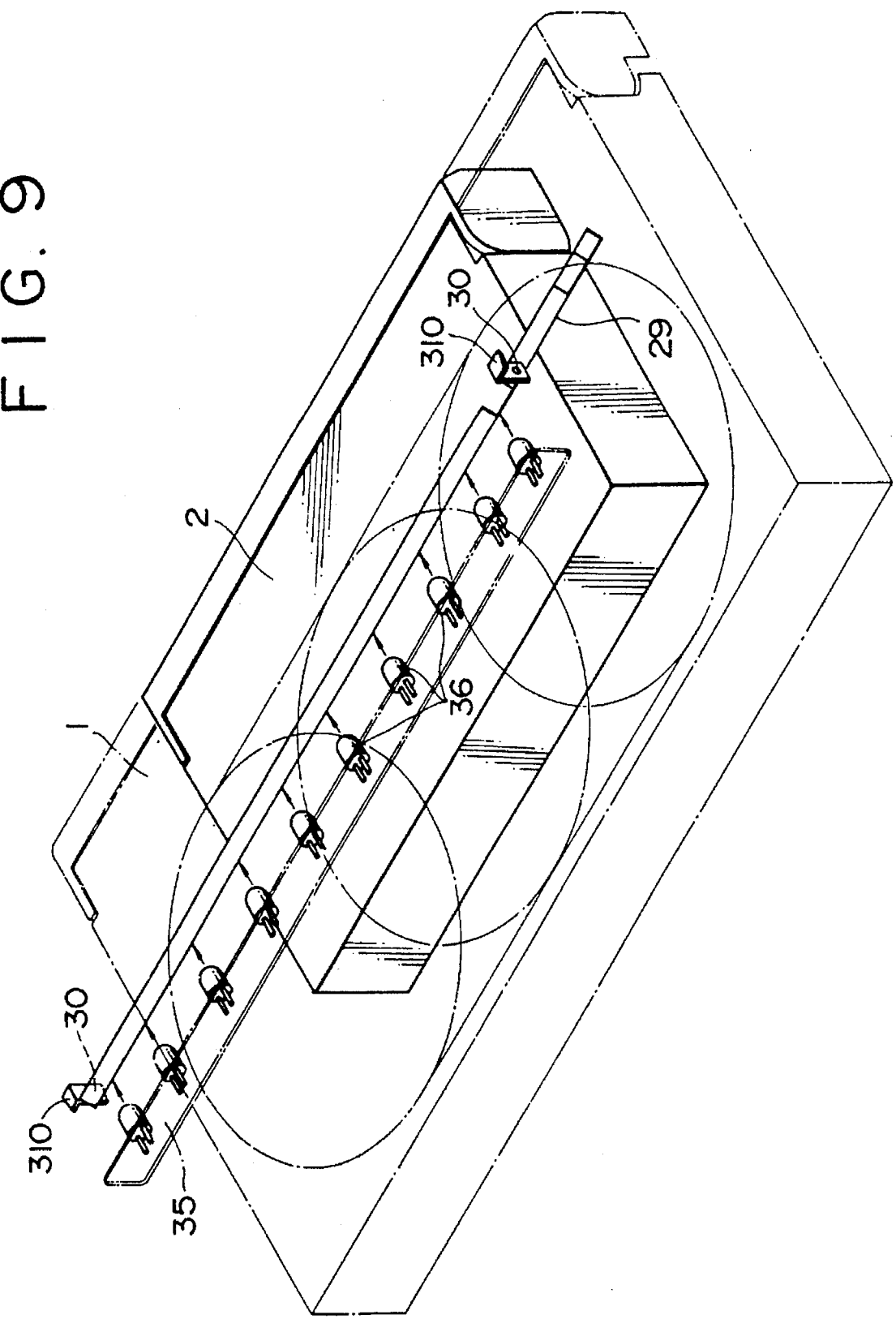
FIG. 9 is a perspective view showing the fourth feature of the cassette loading apparatus.

The fourth feature of the cassette loading apparatus of the present invention is shown in detail in FIGS. 8 and 9. Referring to FIGS. 8 and 9, an elongated printed circuit board 35 is mounted at a location of a lower face of the upper cover 31 displaced in the cassette unloading direction indicated by the arrow mark a' from the reflecting mirror 29 such that it extends vertically and perpendicularly to the cassette inserting direction. A plurality of LEDs (light emitting diodes) 36 in the form of light emitting semiconductor elements are mounted at a comparatively small distance on a face of the printed circuit board 35 in the cassette inserting direction indicated by the arrow mark a such that they are directed in the cassette inserting direction.

When the large or small cassette 1 or 2 is transported to the cassette playing position by the cassette holder 7 and the reflecting mirror 29 is inclined at an angle of e1 as described hereinabove, light emitted from the LEDs 36 and irradiated horizontally in the cassette inserting direction of the arrow mark a is reflected downwardly by an upper portion of the reflecting mirror 29 and radiates from above upon the large or small cassette 1 or 2 located at the cassette playing position.

With the fourth feature having such construction as described above, since light of the LEDs 36 is reflected by the reflecting mirror 29 and radiates from above upon the large or small cassette 1 or 2 located at the cassette playing position, a sufficiently long light path can be assured between the LEDs 36 and the upper face of the large or small cassette 1 or 2. Accordingly, the sharply directional light from the LEDs 36 can be dispersed sufficiently by the reflecting mirror 29 (the efficiency of the reflecting mirror 29 in dispersing light is particularly high when the reflecting mirror 29 is formed from a metal plate such as a stainless steel plate having a polished mirror face as compared with a glass mirror) such that beams of light radiate uniformly and brightly in the very wide irradiating range F2 in an overlapping relationship with each other upon the upper face of the large and small cassette 1 or 2.

Fifth Feature

Figure 10:
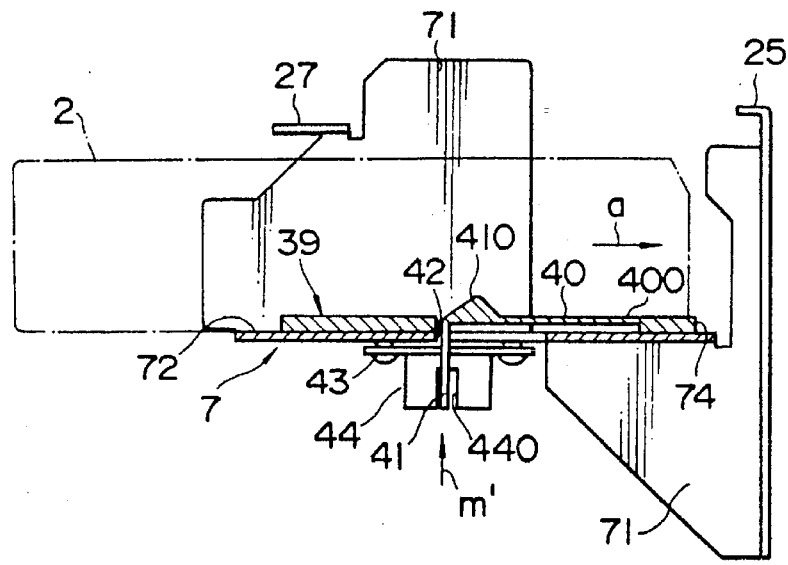
FIG. 10 is a partial side elevational view, partly in section, of the cassette loading apparatus showing a fifth feature when a small cassette is present.
Figure 11:
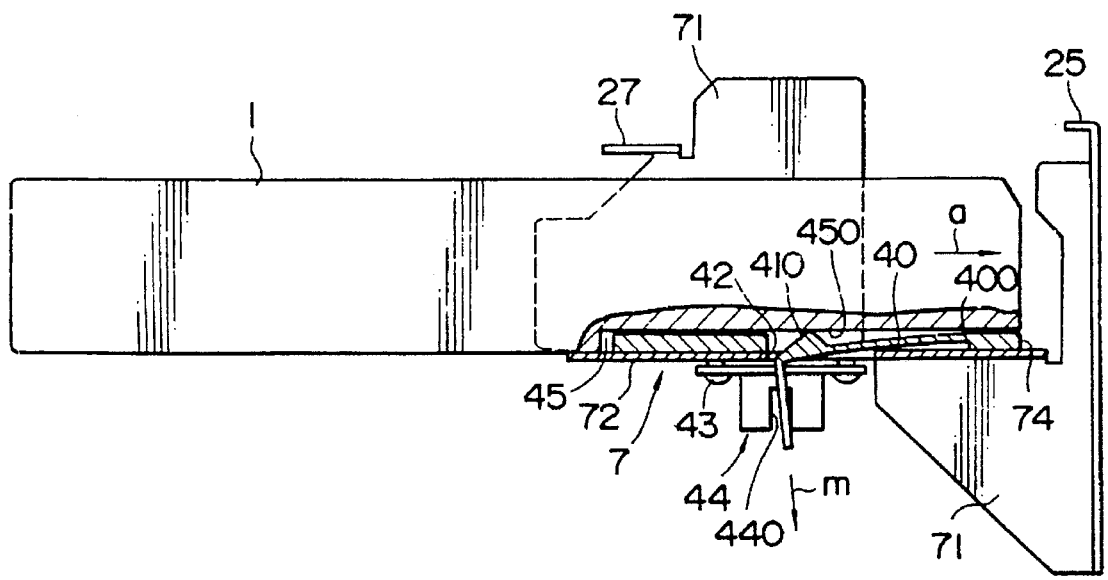
FIG. 11 is a similar view but showing the fifth feature when a large cassette is detected.

The fifth feature of the cassette loading apparatus of the present invention is shown in detail in FIGS. 10 and 11. Referring to FIGS. 10 and 11, a pair of cassette insertion guides 39 for positioning either one of the large and small cassettes 1 and 2 selectively inserted onto the bottom plate 72 of the cassette holder 7 are mounted on the bottom plate 72 and extended in parallel to each other in the cassette inserting direction.

The cassette insertion guides 39 are molded from a synthetic resin, and a cassette size detecting lever 41 is formed integrally on one of the cassette insertion guides 39 by way of a resilient arm 40. A lower end of the cassette size detecting lever 41 extends downwardly through an opening 42 formed in the bottom plate 72 of the cassette holder 7 so that it operates a cassette size detecting switch 44 in the form of a photocoupler mounted on a printed circuit board 43 which is in turn mounted on a lower face of the bottom plate 72 of the cassette holder 7.

When a small cassette 2 is inserted into the cassette holder 7 in the direction of the arrow mark a as shown in FIG. 10, it will not operate the cassette size detecting lever 41 at all and the cassette size detecting switch 44 will maintain, for example, its off state.

On the other hand, when the large cassette 1 is inserted into the cassette holder 7 in the direction of the arrow mark a as shown in FIG. 11, a pair of insertion guide grooves 45 formed on a bottom face of the large cassette 1 are fitted in the direction of the arrow mark a with outer peripheries of the cassette insertion guides 39, and a bottom face 450 of one of the insertion guide grooves 45 corresponding to the cassette insertion guide 39 having the cassette size detecting lever 41 thereon pushes an upwardly protruded portion 410 formed in a triangular shape integrally at an upper end of the cassette size detecting lever 41 so that the portion 410 moves in the downward direction indicated by an arrow mark m. Thereupon, the resilient arm 40 is deformed against the resiliency thereof so that the cassette size detecting lever 41 is moved down in the direction of the arrow mark m to change over the cassette size detecting switch 44 to an on state. Consequently, it is detected that the cassette inserted is the large cassette 1.

With the fifth feature having the construction as described above, since one of the cassette insertion guides 39 is used also as the cassette size detecting lever 41, the number of parts and the number of steps for assembling the cassette loading apparatus are reduced. Further, since the cassette size detecting lever 44 can be mounted accurately simply by mounting the cassette insertion guides 39 accurately onto the bottom plate 72 of the cassette holder 7, detection of the large cassette 1 can always be performed accurately.

Other Features

Various other features of the cassette loading apparatus of the present invention will now be described.

Figure 12:
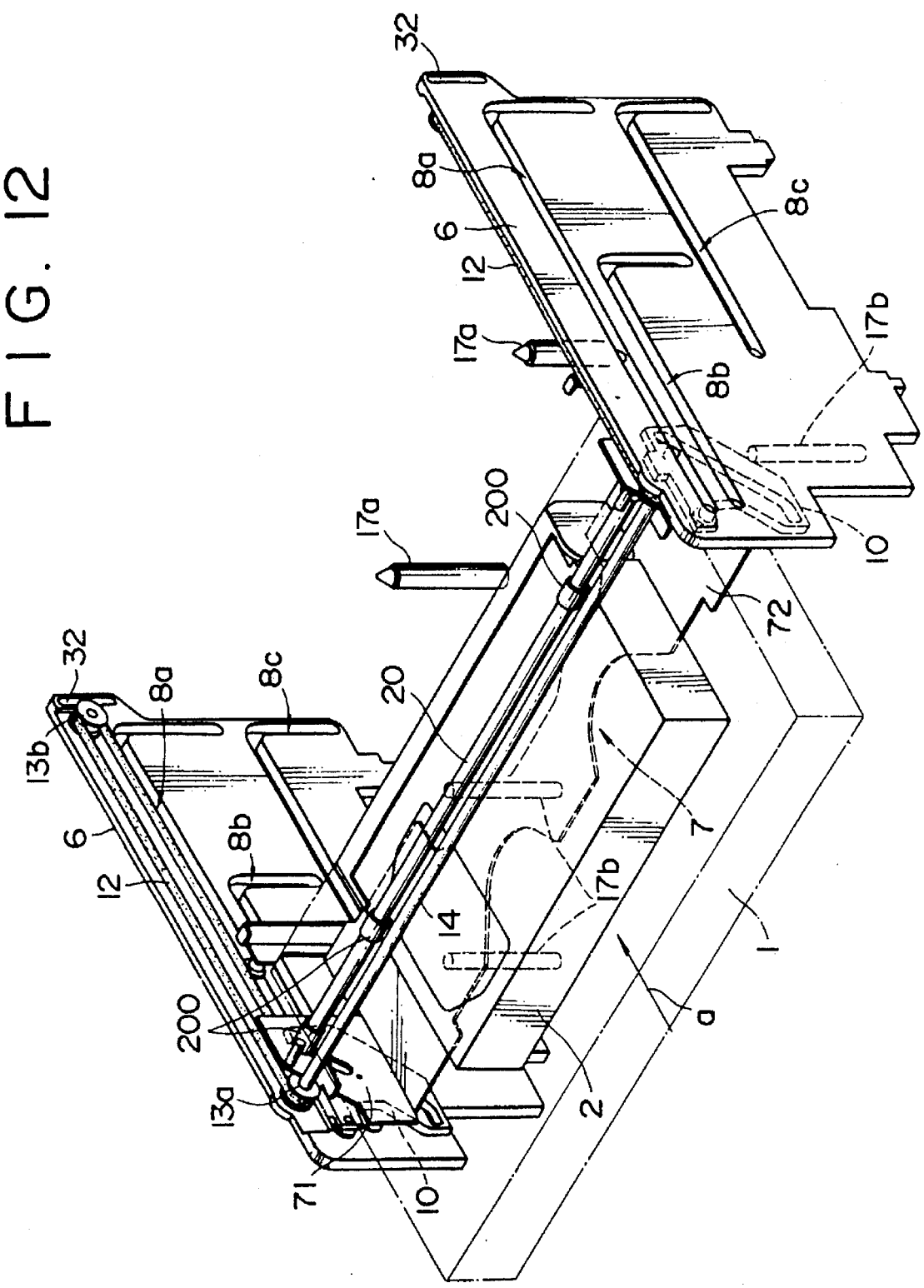
FIG. 12 is a perspective view showing the entire cassette loading apparatus when a cassette is being inserted in the cassette holder.
Figure 13:
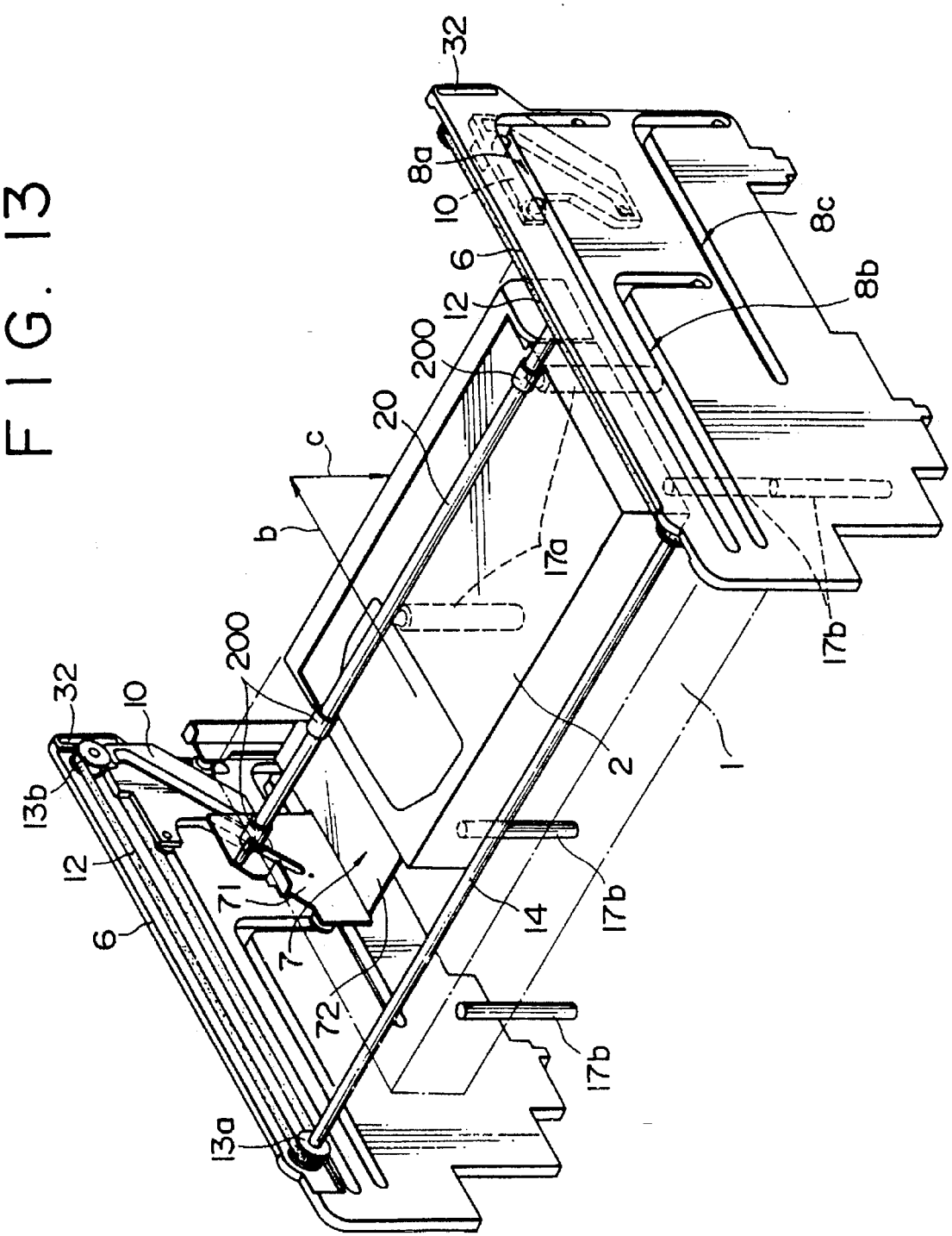
FIG. 13 is a similar view but showing the cassette loading apparatus when a cassette is positioned at the cassette playing position.
Figure 14:
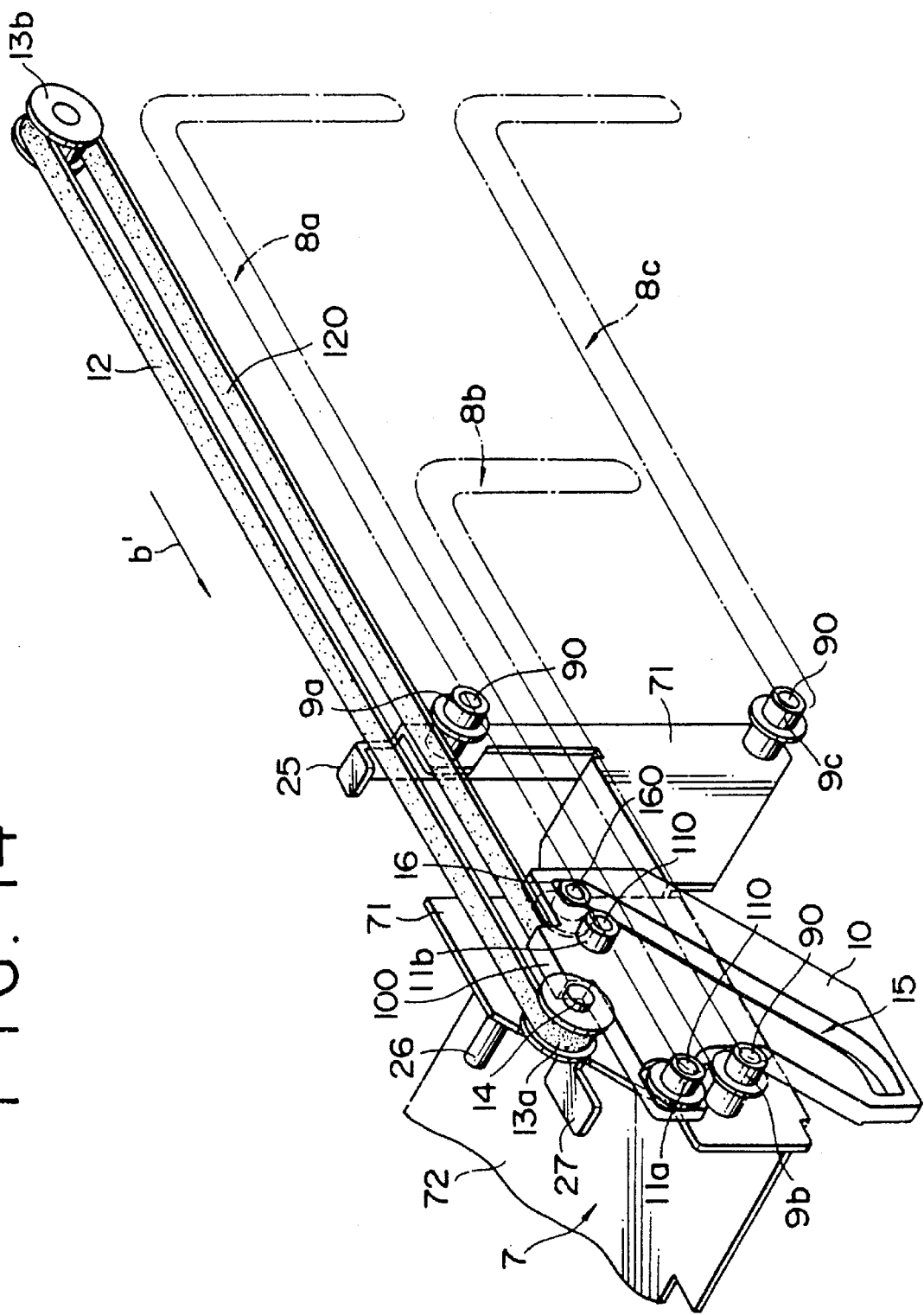
FIG. 14 is an enlarged perspective view showing a slider and a timing belt at individual home positions.
Figure 15:
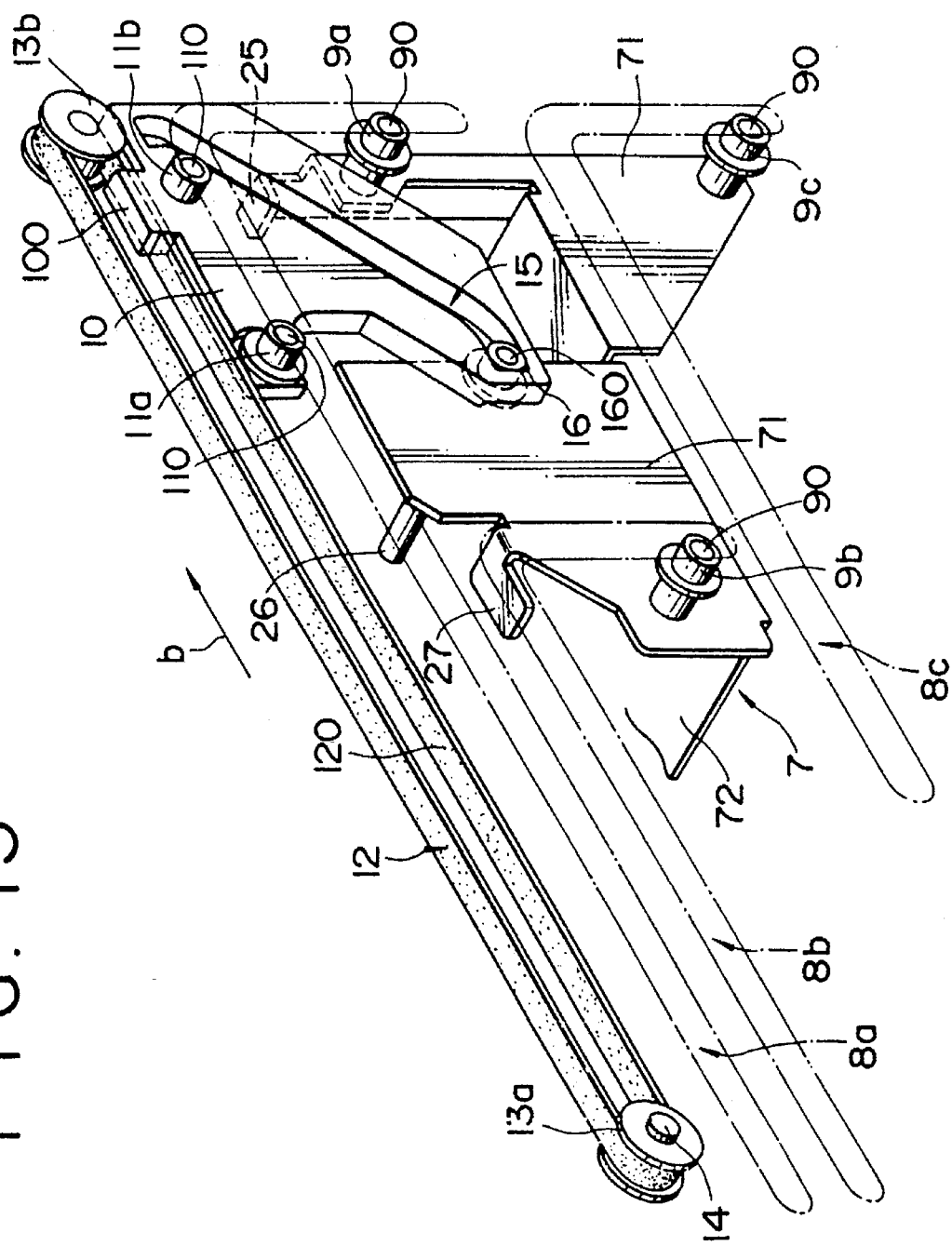
FIG. 15 is a similar view but showing the slider and the timing belts at individual moved positions.
Figure 16:
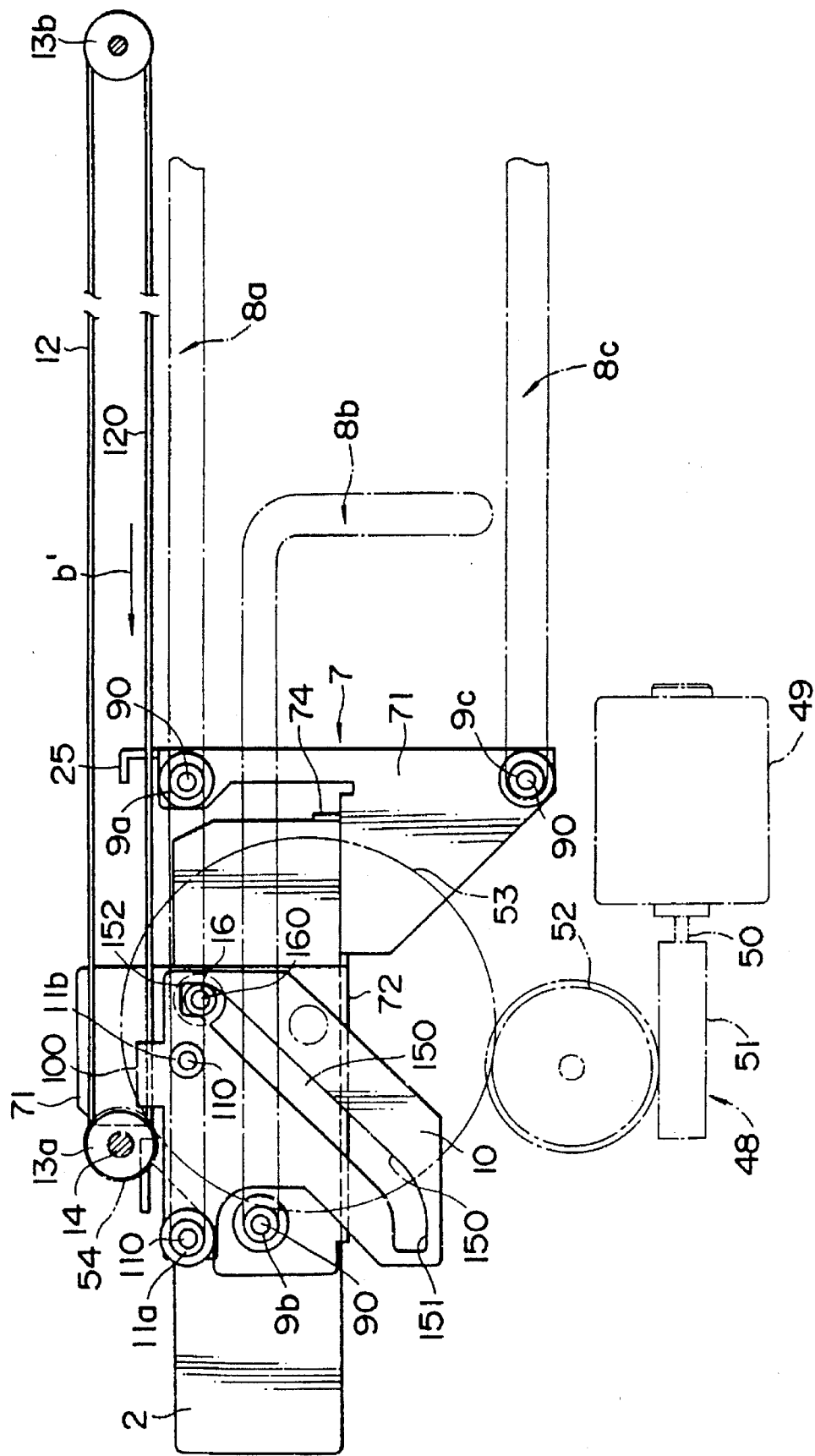
FIG. 16 is a side elevational view showing the slider and the timing belt at the home positions.
Figure 17:
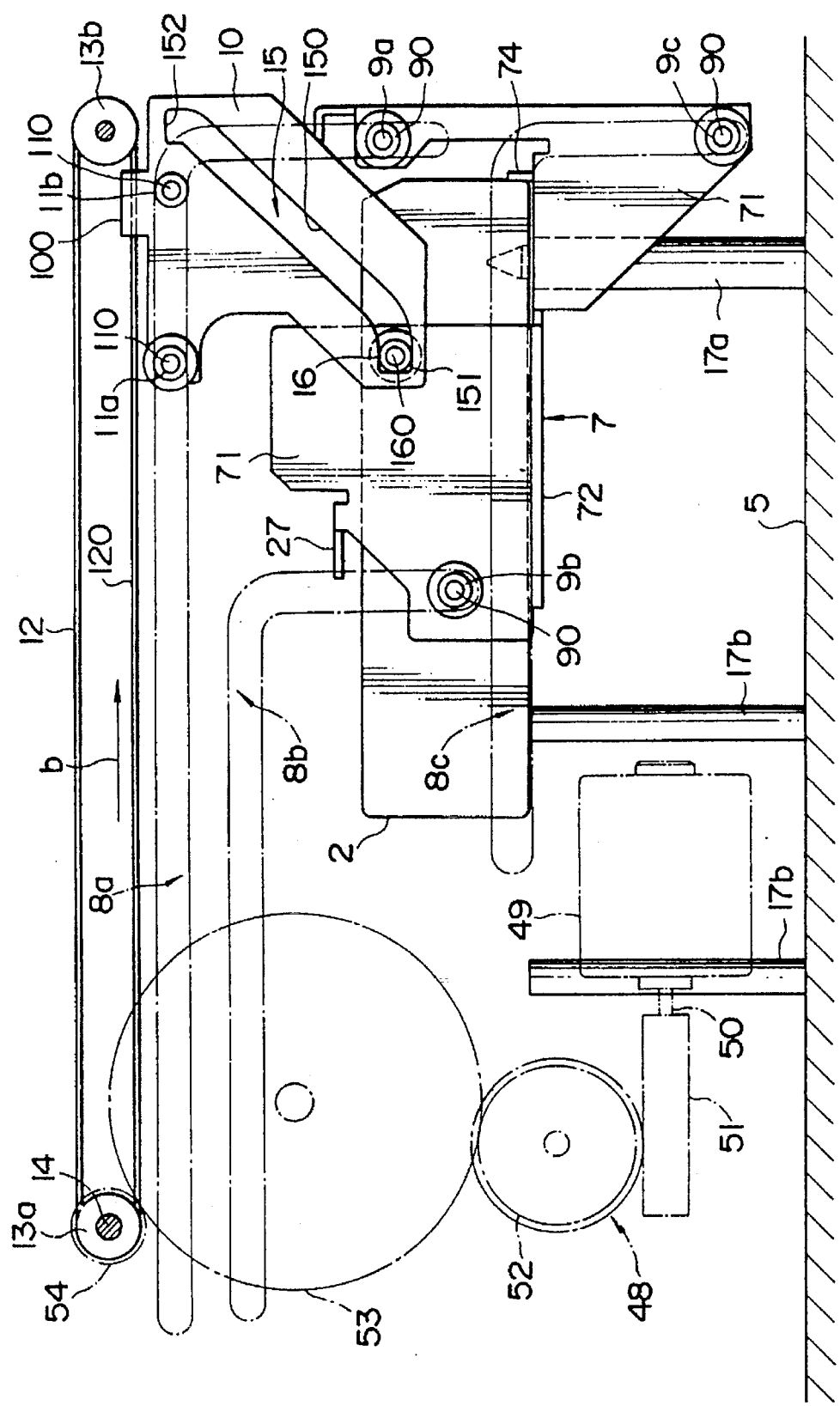
FIG. 17 is a similar view but showing the slider and the timing belt at the moved positions.
Figure 27:
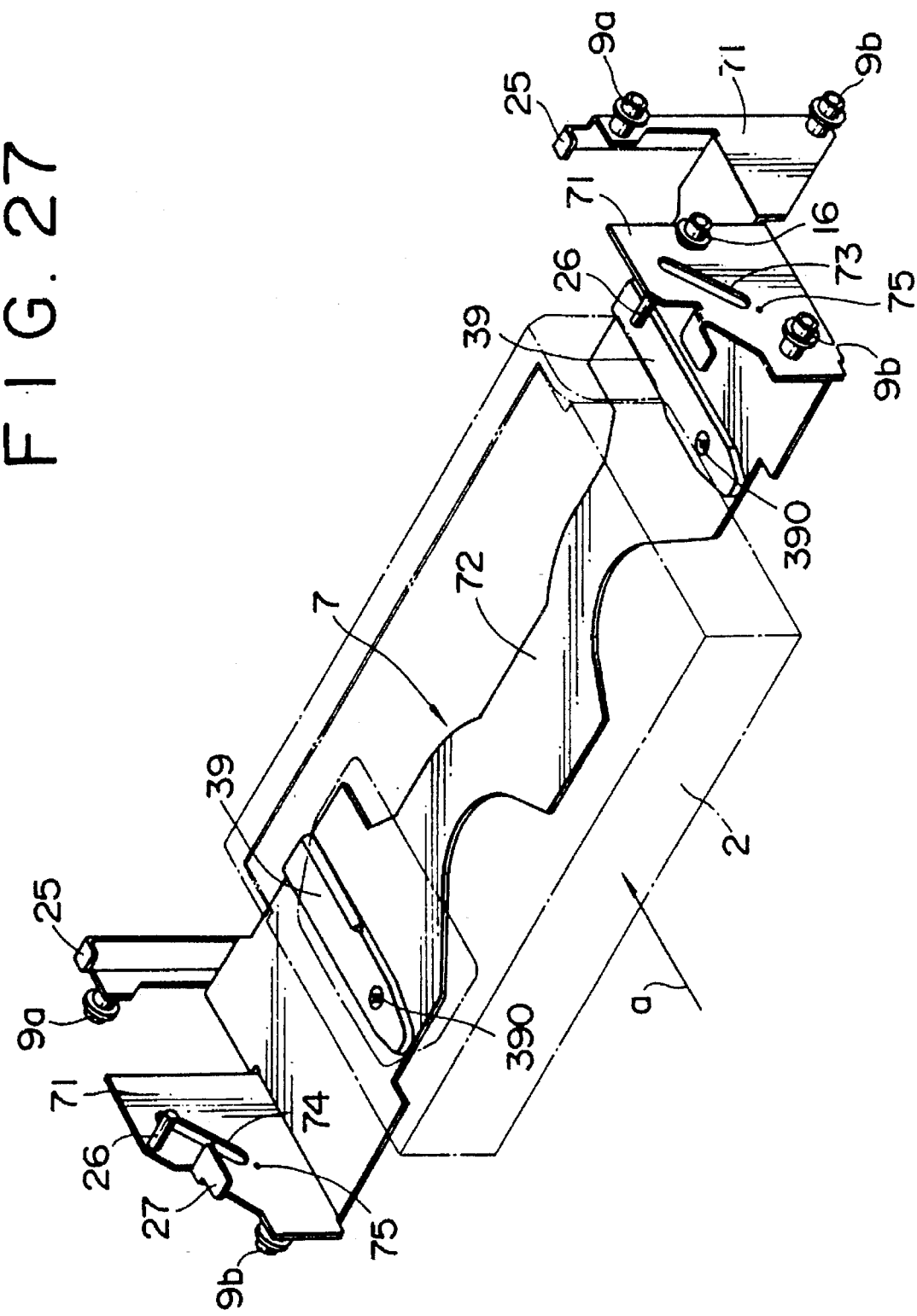
FIG. 27 is a perspective view showing a cassette insertion guide when a small cassette is positioned thereby.
Figure 28:
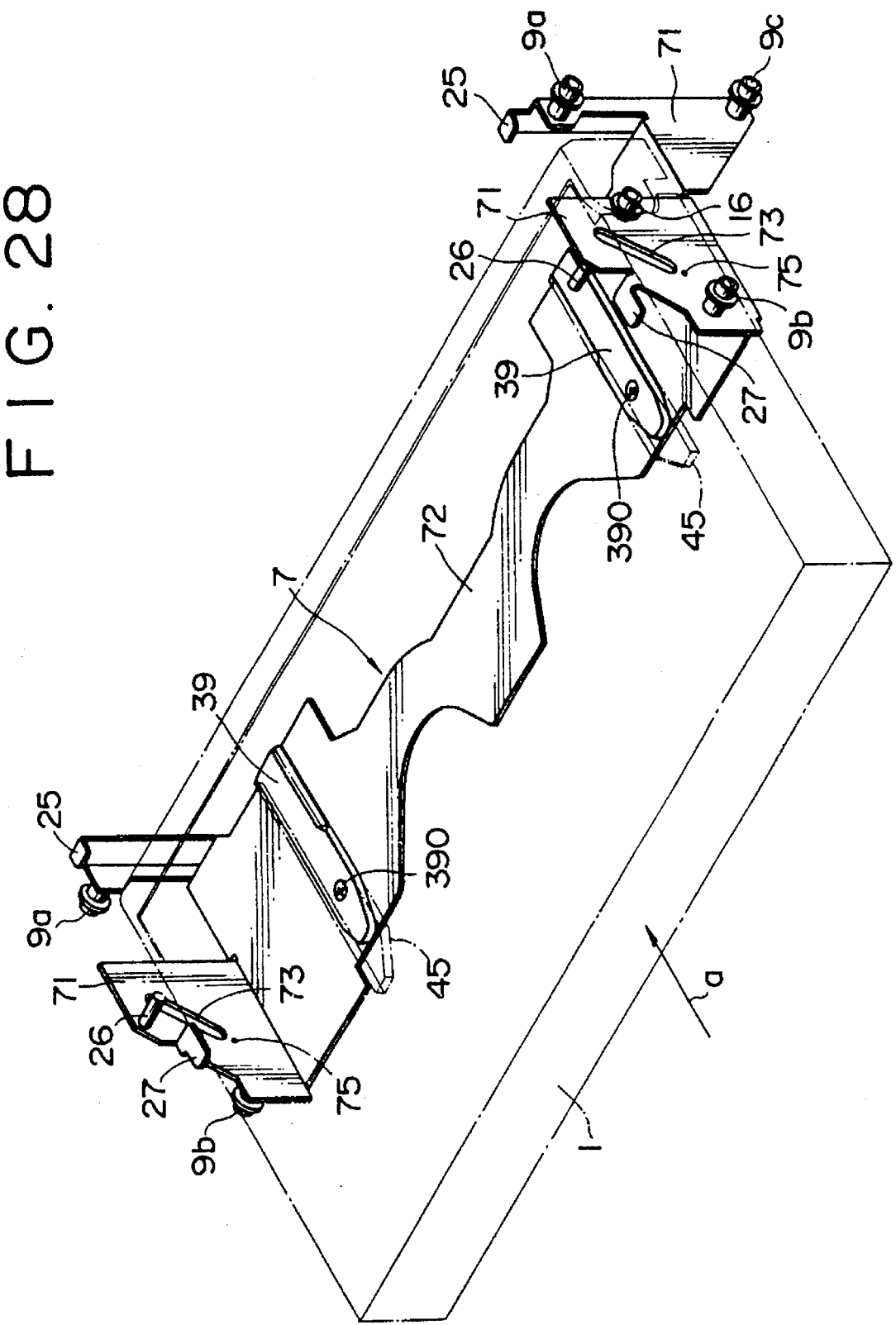
FIG. 28 is a similar view but showing the cassette insertion guide when a large cassette is positioned thereby.

Referring first to FIGS. 12 and 13, the left and right guide plates 6, cassette holder 7, left and right sliders 10 and so forth are shown. The cassette holder 7 is constructed in such a profile that the left and right side plates 71 extend vertically upwardly and downwardly from the opposite left and right ends of the horizontal bottom plate 72 as shown in FIGS. 27 and 28. The resiliently urging shaft 20 is supported horizontally in a perpendicular direction to the cassette inserting direction on and between upper end portions substantially at the middle of the left and right side plates 71 in the cassette inserting direction. A total of four resiliently pressing rubber tubes 200 are fitted on an outer periphery of the resiliently urging shaft 20 at two intermediate locations in the leftward and rightward lengthwise direction and at two locations adjacent the opposite ends of the resiliently urging shaft 20. The driving shaft 14 for the left and right timing belts 12 is supported for rotation at locations of the side plates 71 forwardly of and higher than the resiliently urging shaft 20 so that it extends in parallel to the resiliently urging shaft 20. While the large or small cassette 1 or 2 is selectively inserted horizontally in the direction of the arrow mark a between the bottom plate 72 of the cassette holder 7 and the resiliently urging shaft 20 as shown in FIG. 12, it is positioned so that the center thereof in the leftward and rightward lengthwise direction is arranged on the center of the bottom plate 72 in the leftward or rightward lengthwise direction by a positioning action by the cassette insertion guides 39 which will be hereinafter described. The large or small cassette 1 or 2 is moved in the direction of the arrow mark c to the cassette playing position as shown in FIG. 13 while it is held in the thus positioned condition. It is to be noted that an end face of the large or small cassette 1 or 2 in the cassette inserting direction contacts with and is arranged in an aligned condition with a cassette stopper 74 formed on the bottom plate 72 of the cassette holder 7 as shown in FIG. 1.

Referring now to FIGS. 14 to 17, the slider 10 and timing belt 12 on one of the side plates 71 of the cassette holder 7 and a driving system 48 for the timing belt 12 are shown. The guide rollers 9a, 9b, 9c, 11a, 11b and 16 are mounted for rotation on the side plate 71 and a side face of the slider 10 by way of roller shafts 90, 110 and 160, respectively. Meanwhile, the driving system 48 for the timing belt 12 is mounted on one of the guide plates 6 corresponding to the side plate 71 and includes a motor 49, a worm 51 mounted on a shaft 50 of the motor 49, a worm wheel 51, a pair of speed reducing gears 53 and 54 and so forth. The last gear 54 is securely mounted at an end portion of the drive shaft 14. Accordingly, upon forward or reverse driving rotation of the motor 49, the drive shaft 14 is driven to rotate in a forward or reverse direction by means of the driving system 48 so that the left and right timing belts 12 are simultaneously driven to circulate in a forward direction indicated by the arrow mark b or in a reverse direction indicated by the arrow mark b'.

Figure 18:
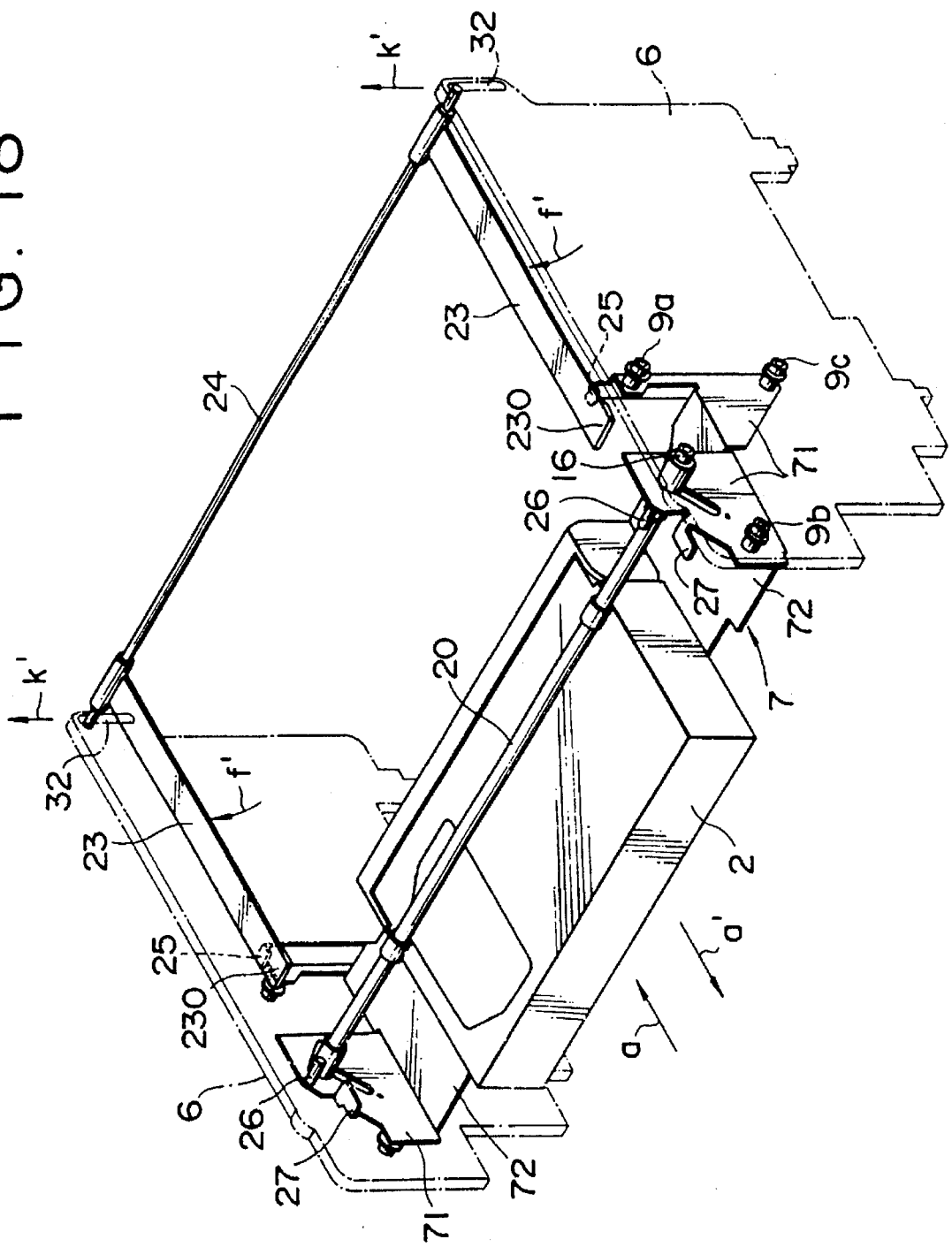
FIG. 18 is a perspective view showing a resiliently urging arm when a cassette is being inserted in the cassette holder.
Figure 19:
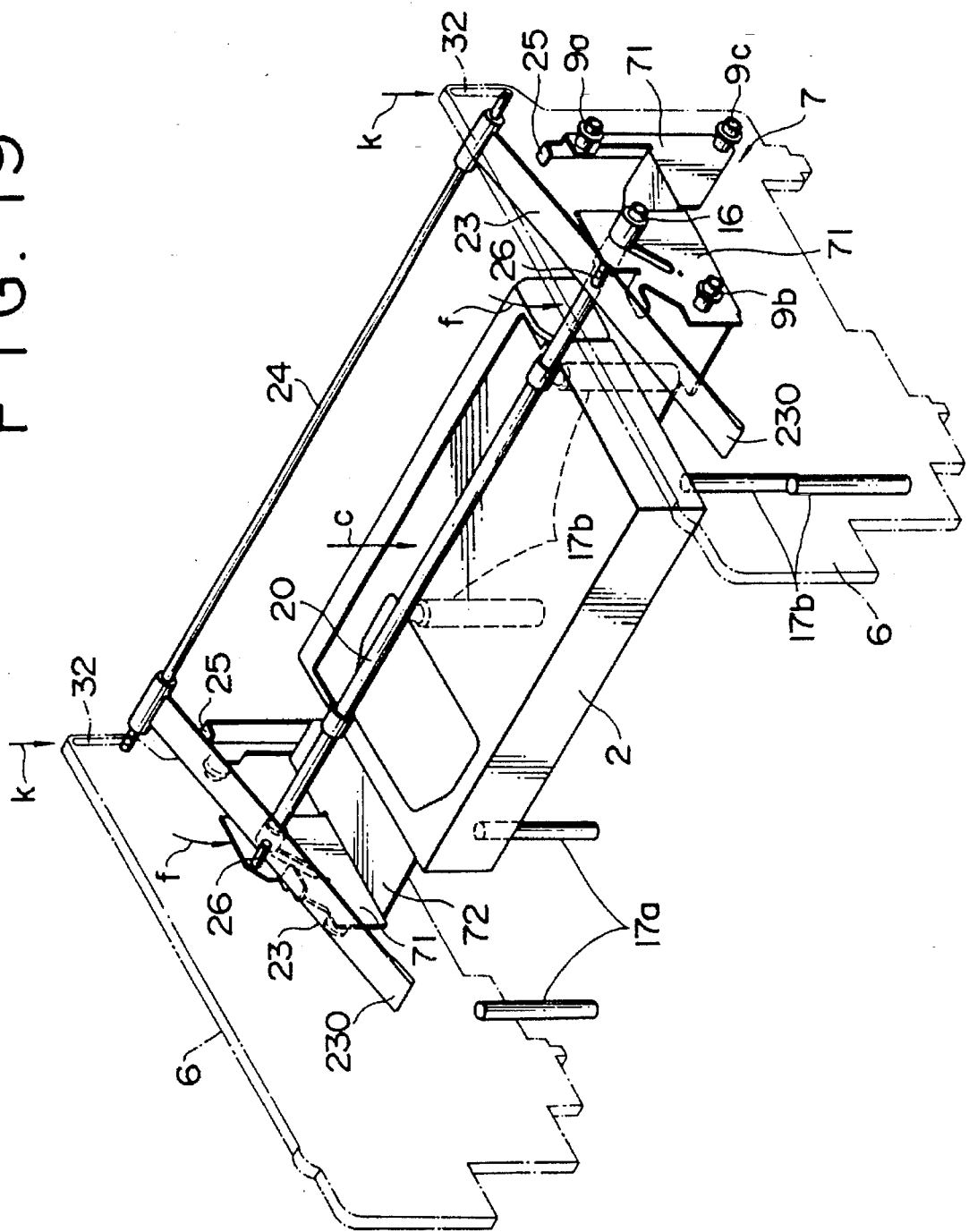
FIG. 19 is a similar view but showing the resiliently urging arm when a small cassette is positioned at the cassette playing position.
Figure 20:
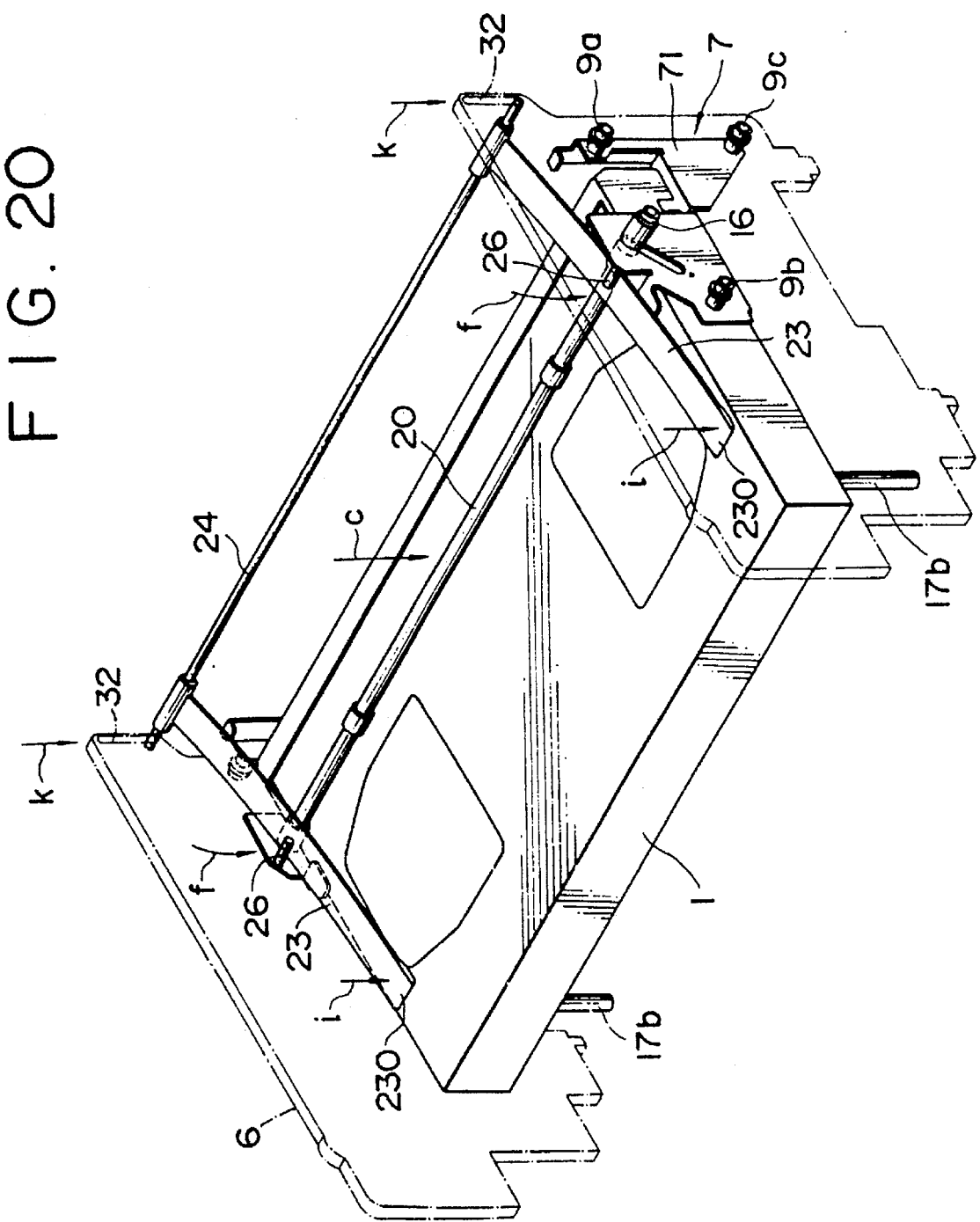
FIG. 20 is a similar view but showing the resiliently urging arm when a large cassette is positioned at the cassette playing position.

Referring now to FIGS. 18 to 20, the left and right resiliently urging arms 23 serving also as reflecting mirror supporting arms are shown. The left and right elongated holes 32 are formed at upper rear end portions of the left and right guide plates 6, respectively, in the cassette inserting direction and extend in the upward and downward directions. The horizontal fulcrum shaft 24 extends horizontally in a perpendicular direction to the cassette inserting direction, and the opposite end portions thereof are loosely fitted in the left and right elongated holes 32, respectively, for movement in the upward and downward directions of the arrow marks k and k'. The left and right resiliently urging arms 23 are disposed adjacent the inner faces of the left and right guide plates 6, and end portions of the resiliently urging arms 23 in the cassette inserting direction are securely mounted at the opposite left and right end portions of the fulcrum shaft 24. The resiliently urging arms 23 are supported for pivotal motion in the upward and downward directions of the arrow marks f and f' around the fulcrum shaft 24 at locations displaced outwardly in the leftward and rightward lengthwise direction from the opposite ends of the small cassette 2 inserted in the cassette holder 7. Accordingly, when the small cassette 2 is moved in the direction of the arrow mark c to the cassette playing position as shown in FIG. 19, even if the left and right resiliently urging arms 23 are pivoted in the direction of arrow mark f, the movable ends 230 thereof will not be in contact with the small cassette 2. However, when the large cassette 1 is moved in the direction of the arrow mark c to the cassette playing position and the left and right resiliently urging arms 23 are pivoted in the direction of the arrow mark f as shown in FIG. 20, the movable ends 230 thereof are resiliently pressed against the opposite left and right end portions of an upper face of the large cassette 1.

Figure 21:
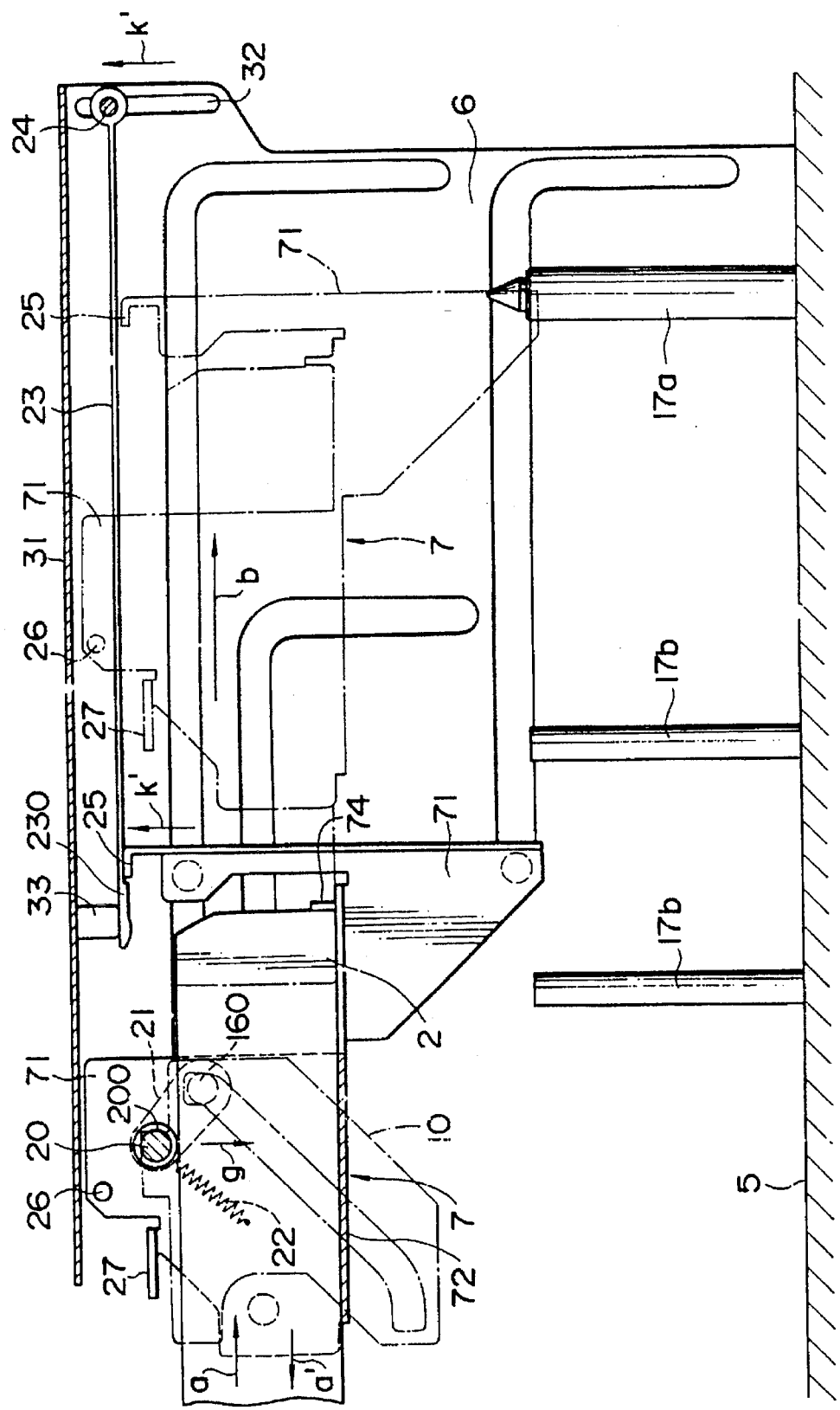
FIG. 21 is a side elevational view, partly in section, showing a resiliently urging shaft and the resiliently urging arm when a cassette is being inserted in the cassette holder.
Figure 22:
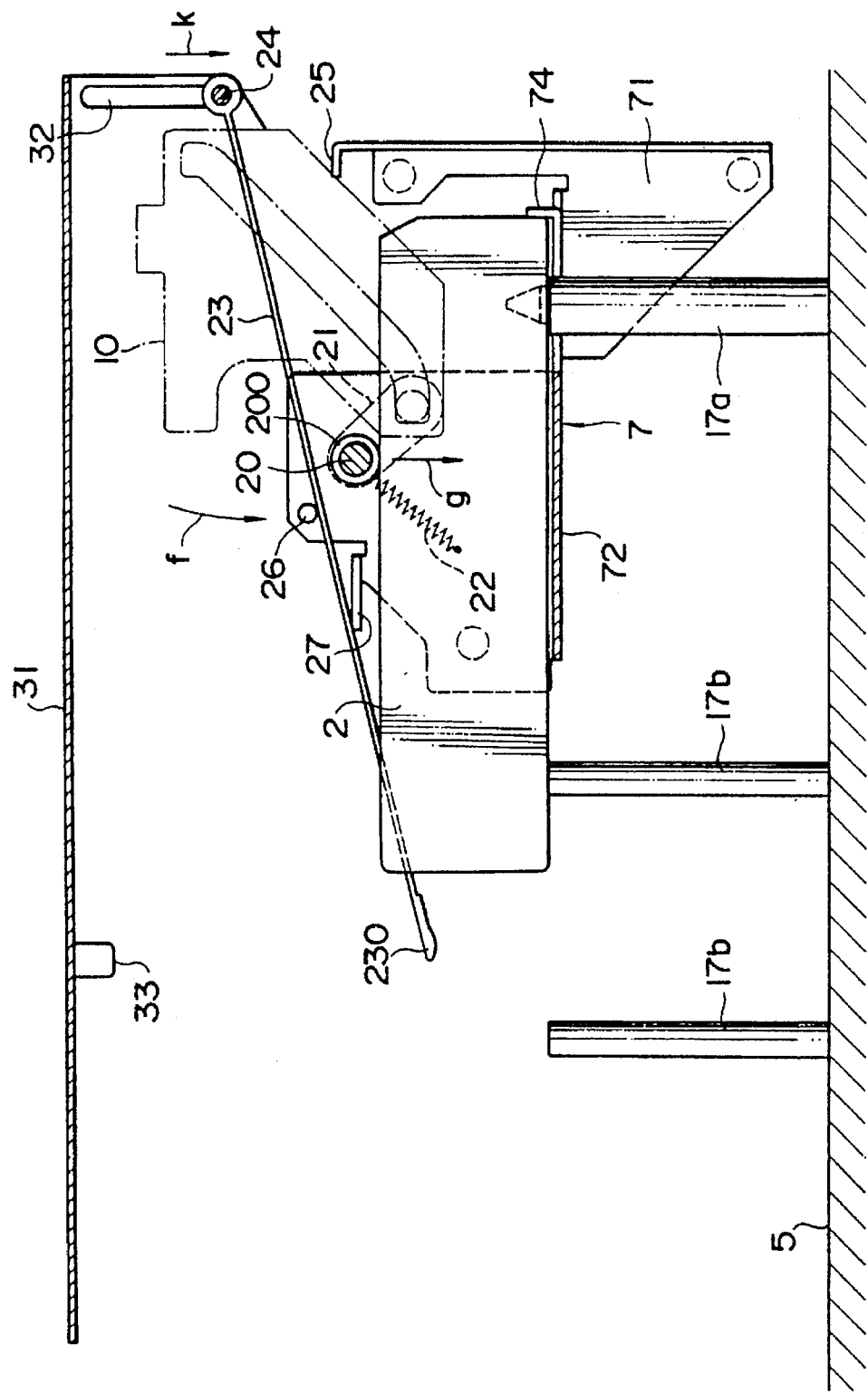
FIG. 22 is a similar view but showing a small cassette resiliently pressed by the resiliently urging shaft.
Figure 23:
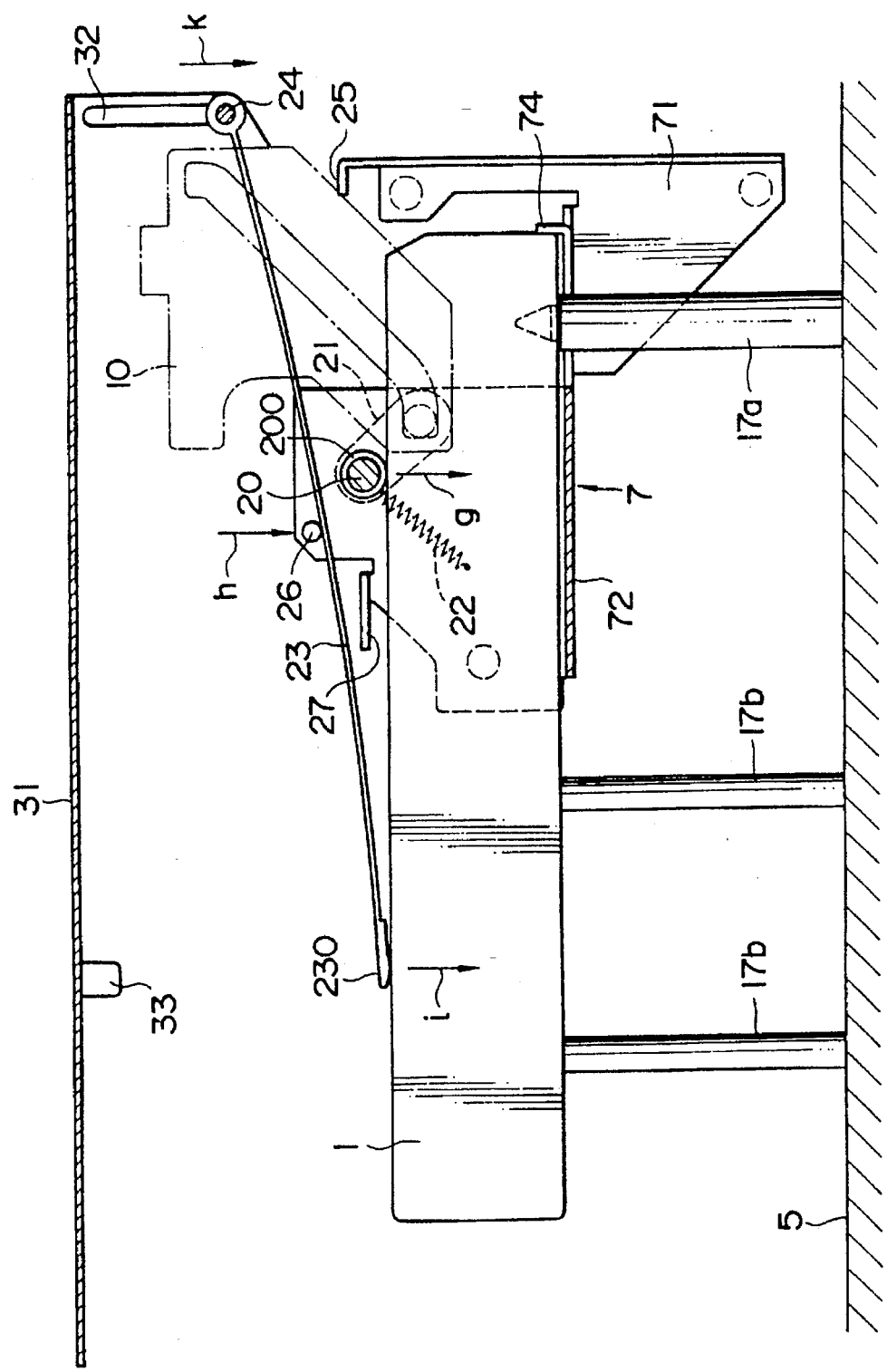
FIG. 23 is a similar view but showing a large cassette resiliently pressed by the resilient urging shaft and the resiliently urging arm.

Referring now to FIGS. 21 to 23, the resiliently urging shaft 20 and the resiliently urging arms 23 are shown in different operating conditions. When the cassette holder 7 is at the cassette receiving position as shown in FIG. 21, the supporting tabs 25 support the movable ends 230 of the resiliently urging arms 23 in the direction of the arrow mark k' from below such that portions of the movable ends 230 displaced in the cassette unloading direction of the arrow mark a' from the supporting tabs 25 are pressed in the direction of the arrow mark k' from below against the contacting tabs 33 of the upper cover 31. Consequently, the resiliently urging arms 23 are held in their horizontal position pushed up in the direction of the arrow mark k' along the elongated holes 32.

On the other hand, when the large or small cassette 1 or 2 is inserted in the direction of the arrow mark a between the bottom plate 72 of the cassette holder 7 and the resiliently urging shaft 20, the resiliently urging shaft 20 is resiliently pressed in the direction of the arrow mark g against the upper face of the large or small cassette 1 or 2 by way of the resiliently pressing rubber tubes 200 on the outer periphery thereof. A pair of left and right contacting tabs 27 are formed horizontally at locations of the left and right side plates 71 of the cassette holder 7 a little lower than the left and right resiliently urging pins 26 and displaced in the cassette unloading direction of the arrow mark a' from the resiliently urging pins 26 as shown in FIG. 27. When the cassette holder 7 is drawn in horizontally in the direction of the arrow mark b from the cassette receiving position shown in FIG. 21 to the intermediate position, the horizontal resiliently urging arms 23 are inserted between the resiliently urging pins 26 and the contacting tabs 27 such that the resiliently urging pins 26 and the contacting tabs 27 are positioned above and below the horizontal resiliently urging arms 23, respectively. Then, when the large or small cassette 1 or 2 is moved from the intermediate position to the cassette playing position as shown in FIGS. 22 and 23, the resiliently urging pins 26 press from above in the direction of the arrow mark h against the resiliently urging arms 23 to pivot the resiliently urging arms 23 in the direction of the arrow mark f. In this instance, if the cassette loaded is a small cassette 2 as shown in FIG. 22, the resiliently urging arms 3 contact and are received by the contacting tabs 27. On the other hand, when the large cassette 1 is loaded at the cassette playing position as shown in FIG. 23, the fulcrum shaft 24 for the resiliently urging arms 23 is moved down until it contacts and is stopped by the lower ends of the elongated holes 32 while the movable ends 230 contact and are stopped by the upper face of the large cassette 1, and the resiliently urging pins 26 press from above in the direction of the arrow mark h against substantially central portions of the resiliently urging arms 23 between the fulcrum shaft 24 and the movable ends 230. Consequently, the resiliently urging arms 23 are deformed like a bow against the resiliency thereof, and the movable ends 230 press from above in the direction of the arrow mark i against the large cassette 1 due to the repulsive force of the resiliently urging arms 23. Meanwhile, the resiliently urging arms 23 are spaced upwardly from the contacting portions 27.

Incidentally, when the large or small cassette 1 or 2 is resiliently pressed from above in the direction of the arrow mark g or i against the height reference pins 17a and 17b at the cassette playing position by the resiliently urging shaft 20 and/or the left and right resiliently contacting arms 23 as shown in FIGS. 22 and 23, the cassette holder 7 is acted upon by a reactive force in the upward direction of the arrow mark c'. However, displacement of the cassette holder 7 in the upward direction is prevented because the guide rollers 16 of the cassette holder 7 are received in the horizontal lower ends 151 of the inclined guides 15 formed in the left and right sliders 10 so that the cassette holder 7 is mechanically positioned and locked readily and accurately at the cassette playing position as described hereinabove in connection with the first feature shown in FIGS. 1 and 2. Accordingly, the resiliently urging force is applied in a stable manner to the large or small cassette 1 or 2 by the resiliently urging shaft 20 or the left and right resiliently urging arms 23, and there is no need to provide a torque limiter or special locking mechanism in the driving system 48 shown in FIGS. 16 and 17.

Figure 24:
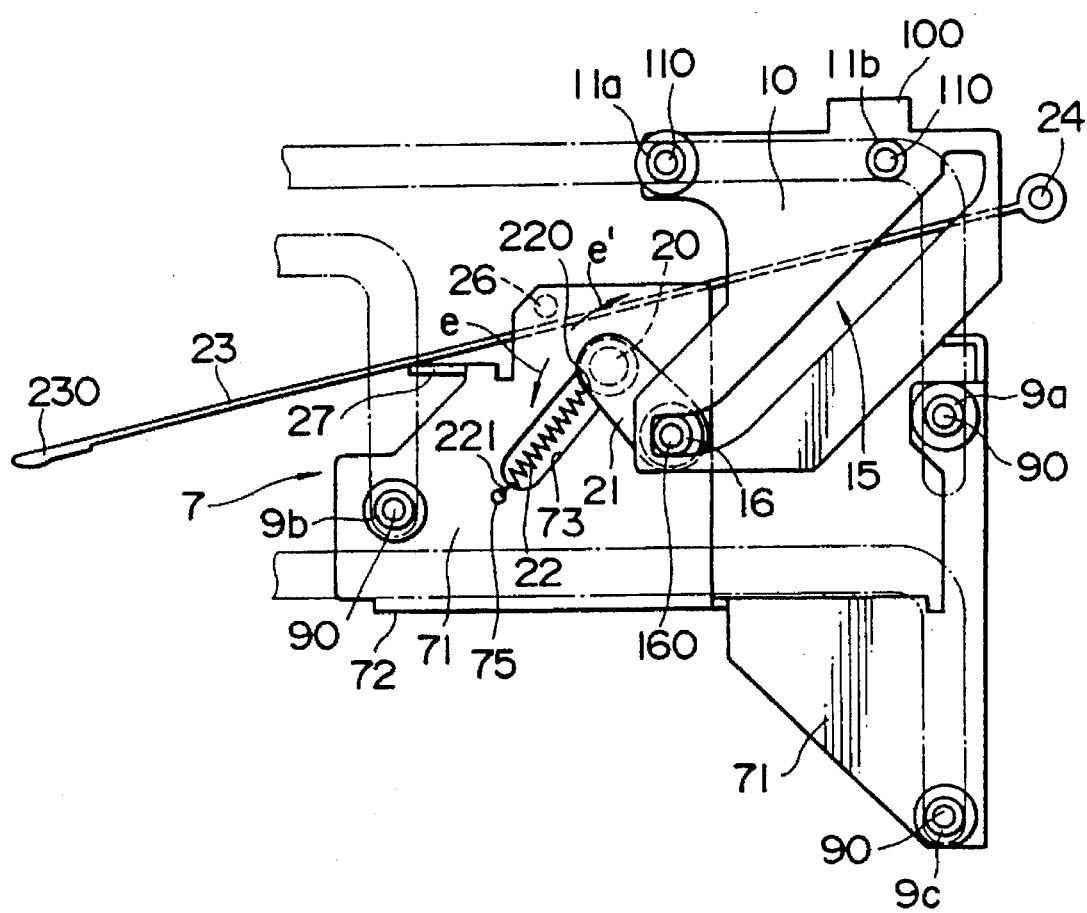
FIG. 24 is a partial side elevational view of the cassette holder and a slider.
Figure 25:
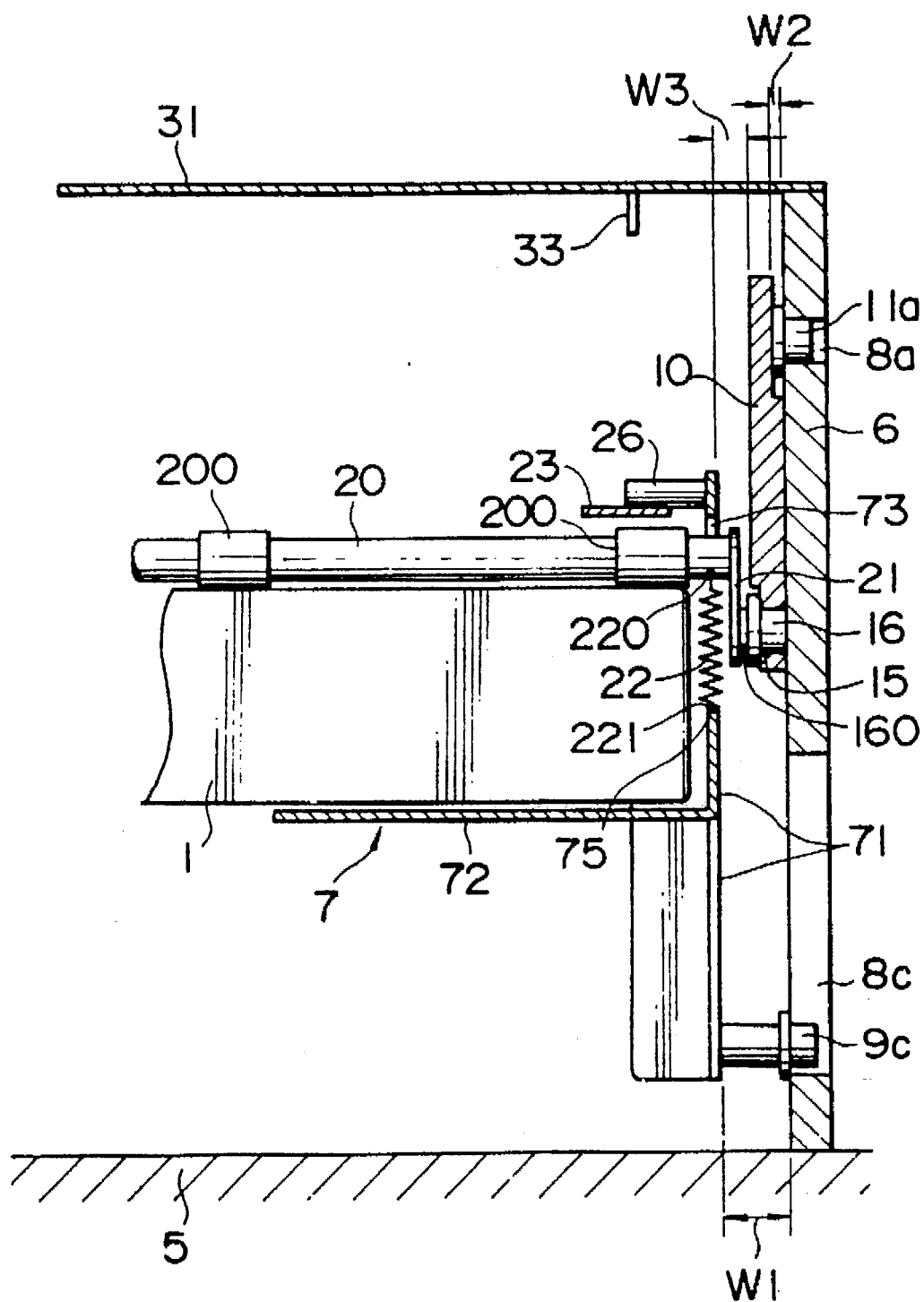
FIG. 25 is a vertical sectional view of the cassette holder and the slider shown in FIG. 24.

FIGS. 24 and 25 show the slider 10 and guide plate 6 associated with one of the side plates 71 of the cassette holder 7 and the resiliently urging shaft 20. Referring to FIGS. 24 and 25, the three guide rollers 9a, 9b and 9c are mounted for rotation on an outer side face of the side plate 71 of the cassette holder 7 in a spaced relationship at a relatively large distance W1 from the outer side face of the side plate 71 and are loosely fitted in the three L-shaped guides 8a, 8b and 8c of the guide plate 6. Meanwhile, the guide rollers 11a and 11b are mounted for rotation on an outer side face of the slider 10 in a spaced relationship at a relatively small distance W2 from the outer side face of the slider 10 and are loosely fitted in the first guide portion 81 of the L-shaped guide 8a. Further, the guide roller 16 is mounted for rotation on the side plate 71 of the cassette holder 7 in a spaced relationship at an intermediate distance W3 from the side plate 71 and is loosely fitted in the inclined guide 15 of the slider 10. The opposite left and right end portions of the resiliently urging shaft 20 are fitted in the elongated holes 73 formed in the left and right side plates 71 of the cassette holder 7, and the left and right supporting levers 21 are disposed between the side plates 71 of the cassette holder 7 and the sliders 10. The opposite left and right end portions of the resiliently urging shaft 20 are mounted, at upper ends of the supporting levers 21, and lower ends of the supporting levers 21 are mounted for rotation on outer peripheries of the roller shafts 160 of the guide rollers 16. The left and right urging springs 22 in the form of tension springs are disposed in the left and right elongated holes 73 and the opposite end portions 220 and 221 of the urging springs 22 are anchored at the resiliently urging shaft 20 and spring anchoring portions or holes 75 formed in the side plates 71.

Figure 26:
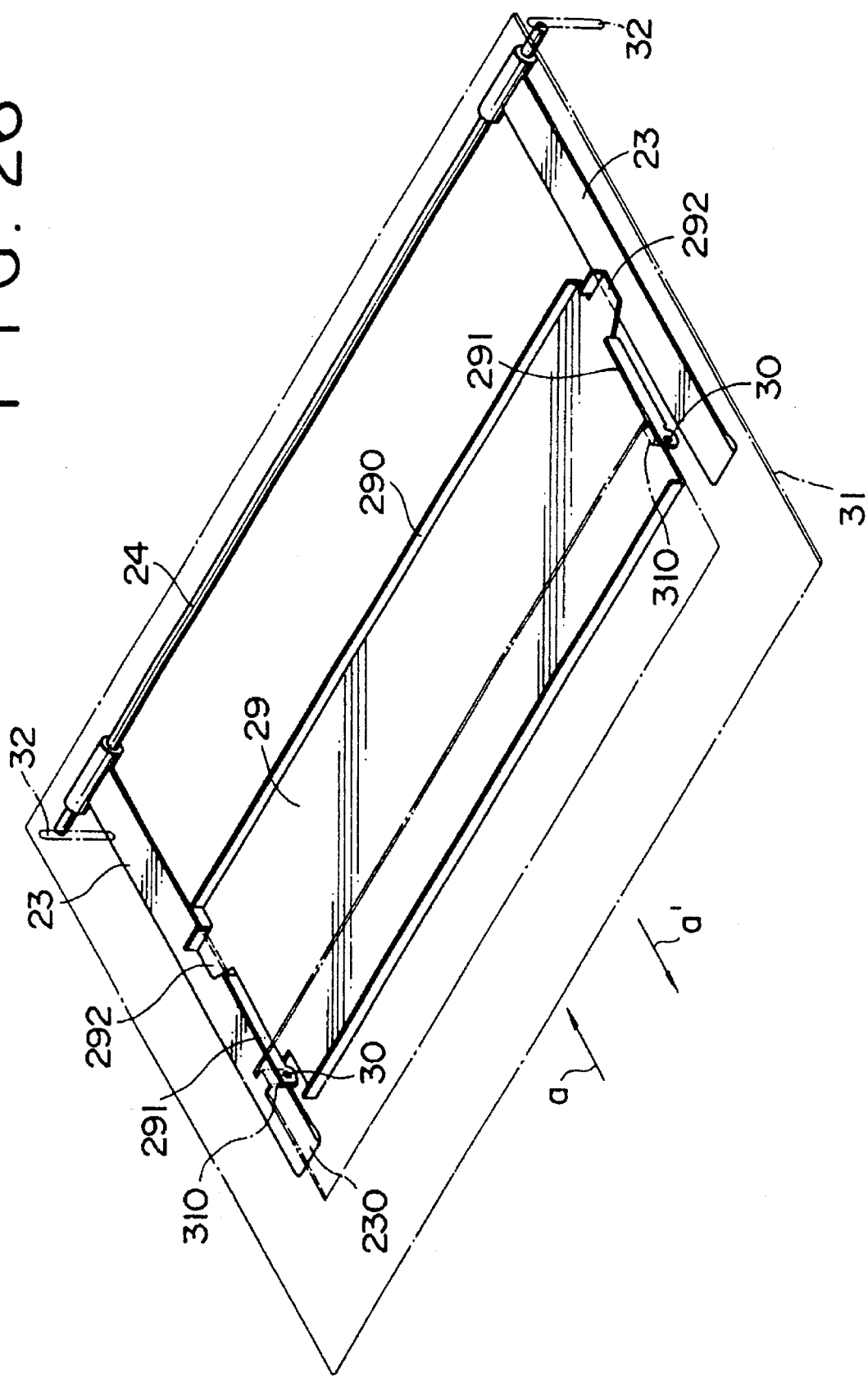
FIG. 26 is a perspective view of a reflecting mirror and the resiliently urging arm.

FIG. 26 illustrates mounting of the reflecting mirror 29. Referring to FIG. 26, the reflecting mirror 29 is formed by presswork of a thin plate produced by polishing of a metal plate such as a stainless steel plate. A pair of left and right side plates 291 are formed by bending the opposite leftward and rightward end portions of the reflecting mirror 29 perpendicularly upward and are mounted at end portions thereof in the cassette unloading direction of the arrow mark a', for pivotal motion in the upward and downward directions indicated by the arrow marks j and j' on a pair of left and right mounting tabs 310 bent downwardly from the upper cover 31 by means of the left and right fulcrum shafts 30. A pair of left and right projected pieces 292 are formed integrally at the opposite left and right ends of the movable end 290 of the reflecting mirror 29 in the cassette inserting direction of the arrow mark a, and the left and right projected pieces 292 are placed on the left and right resiliently urging arms 23, respectively.

FIGS. 27 and 28 show a positioning mechanism for large or small cassette 1 or 2 on the bottom plate 72 of the cassette holder 7. Referring to FIGS. 27 and 28, the left and right cassette insertion guides 39 molded from a synthetic resin are each secured to the bottom plate 72 by means of a screw 390 such that the guides 39 extend in parallel to each other in the cassette inserting direction indicated by the arrow mark a. The small cassette 2 is inserted horizontally in the direction of the arrow mark a onto the bottom plate 72 between the left and right cassette insertion guides 39 and is positioned at the center of the cassette holder 7 in the leftward and rightward direction as seen in FIG. 27. On the other hand, the large cassette 1 is inserted horizontally in the direction of the arrow mark a onto the bottom plate 72 in such a manner that the left and right insertion guide grooves 45 formed on the bottom face of the large cassette 1 may be fitted with the outer peripheries of the left and right cassette insertion guides 39 so that the large cassette 1 is positioned at the center of the cassette holder 7 in the leftward and rightward direction as seen in FIG. 28.

Figure 29:
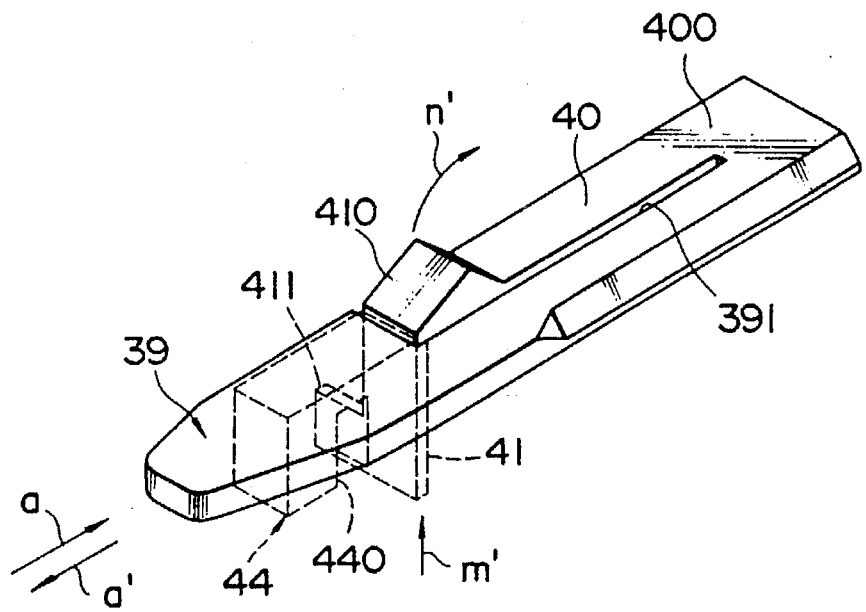
FIG. 29 is an enlarged perspective view of the cassette insertion guide and a cassette size detecting lever.
Figure 30:
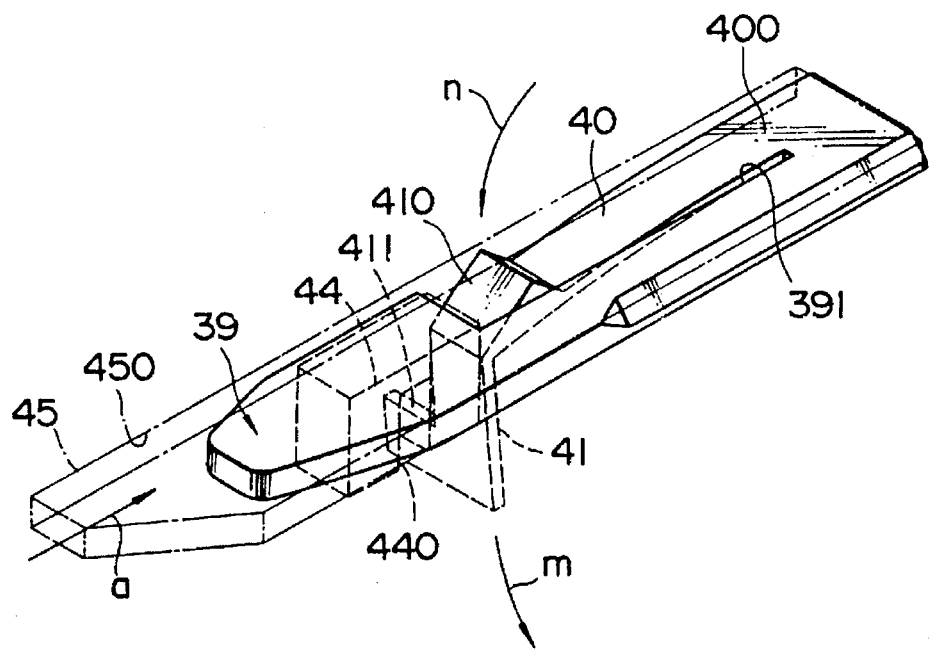
FIG. 30 is a similar view but showing the cassette detecting lever when it detects a large cassette.

FIGS. 29 and 30 show one of the cassette insertion guides 39 which serves as the cassette size detecting lever 41. Referring to FIGS. 29 and 30, the cassette size detecting lever 41 is molded integrally from a synthetic resin on the cassette insertion guide 39 by way of the resilient arm 40. In this instance, the resilient arm 40 is disposed in a recess 391 formed at a side portion of the cassette insertion guide 39, and an end portion 400 thereof in the cassette inserting direction indicated by the arrow mark a is connected integrally to the cassette insertion guide 39. The cassette size detecting lever 41 is connected integrally to and extends vertically downwardly from an end of the resilient arm 40 in the cassette unloading direction indicated by the arrow mark a' and the protruded portion 410 having a triangular profile is formed integrally at the upper end of the cassette size detecting lever 41. The cassette size detecting lever 41 is bent in an L-shape in a vertical plane, and an L-shaped end 411 thereof is inserted in a sideward direction in a light path 440 in the form of a slit of the cassette size detecting switch 44, which is a photocoupler or the like. In a normal condition, the end 441 of the cassette size detecting lever 41 is inserted in the direction of an arrow mark m' in the light path 440 of the cassette size detecting switch 44 by a resilient returning force of the resilient arm 40 in the upward direction of the arrow mark n' such that it intercepts the light path 440 so that the cassette size detecting switch 44 is maintained in an off state.

The insertion guide groove 45 of the large cassette 1 fits in the direction indicated by the arrow mark a with the outer periphery of the cassette insertion guide 39 and the protruded portion 410 is pushed downwardly by the bottom face 450 of the insertion guide groove 45 so that the resilient arm 40 is deformed in the direction indicated by an arrow mark n against the resiliency thereof. Thus, when the cassette size detecting lever 41 is moved in the downward direction indicated by the arrow mark m, the end 441 thereof is moved in the direction of the arrow mark m in the light path 440 of the cassette size detecting switch 44 so that the light path 440 is opened, and consequently, the cassette size detecting switch 44 is changed over into an on state.

It is to be noted that the present invention can be applied not only to a cassette loading apparatus for a professional-use video tape recorder of the front loading type but also to cassette loading apparatus for various recording and/or reproducing apparatus.

Having now fully described the invention, it will be apparent to one of ordinary skill in the art that many changes and modifications can be made thereto without departing from the spirit and scope of the invention set forth herewith.

What is claimed is:

1. A cassette loading apparatus for transporting a tape cassette having one of a plurality of sizes from an insertion opening through which said tape cassette is inserted to a playing position, comprising:

a holder for receiving said tape cassette having any one of said plurality of sizes, said holder having opposite side faces and three guide pins provided on each of the opposite side faces;

a pair of side plates each having three L-shaped guides each of which has a horizontal guide portion for respectively guiding one of said three guide pins in a horizontal direction for moving said tape cassette received in said holder in said horizontal direction inwardly from said insertion opening and a vertical guide portion for respectively guiding said one of said three guide pins in a vertical direction for moving said tape cassette received in said holder vertically to the playing position after said tape cassette has been moved horizontally inwardly from said insertion opening;

a pair of sliders each having an inclined guide which is inclined with respect to the horizontal guide portions and vertical guide portions of said L-shaped guides, each of said sliders further having two guide rollers arranged such that the two guide roller of each slider are guided by only one of said three L-shaped guides, each of said sliders being dimensioned so that it is shorter than said holder in a direction that is parallel to said horizontal direction in which said tape cassette is moved;

driving means for driving said sliders in said horizontal direction with respect to the horizontal guide portions of said L-shaped guides; and an engaging element provided on each of the opposite side faces of said holder for engaging with the inclined guides of said sliders without engaging any of said three L-shaped guides to transmit to said holder a driving force transmitted to said sliders from said driving means;

wherein said holder is moved in said horizontal direction integrally with said sliders by said driving force from said driving means until said guide pins reach end portions of the horizontal guide portions of said L-shaped guides and then said engaging elements move, upon further movement of said sliders in said horizontal direction, downwardly along the inclined guides of said sliders while said holder is moved downwardly under the guidance of the vertical guide portions of said L-shaped guides to transport said tape cassette in said holder to the playing position, wherein the arrangement of said three L-shaped guides in each of said side plates, the dimension of said sliders, and the arrangement of said guide rollers of said sliders and the arrangement of said guide pins and said engaging elements of said holder enable said holder to have a large operation stroke so as to enable said tape cassette having any one of said plurality of sizes to be properly accommodated in said playing position; and wherein the horizontal movement of said sliders is more than the horizontal movement of said holder and said cassette loading apparatus enables said horizontal movement of said sliders to be substantially accommodated when a space for said holder and the horizontal movement thereof so that said sliders project only a relatively small amount past said holder in the horizontal direction when said tape cassette is in said playing position.

2. A cassette loading apparatus according to claim 1, wherein each of the inclined guides of said sliders has, at a lower end portion thereof, a locking face extending in a direction perpendicular to the vertical guide portions of said L-shaped guides for holding the engaging elements at the playing position of said holder.

3. A cassette loading apparatus according to claim 2, wherein said driving means includes a pair of timing belts extending In parallel to the horizontal guide portions of said L-shaped guides, and a drive motor for driving each of said timing belts, said sliders being individually secured to said timing belts in such a manner as to be driven integrally by said timing belts.

4. A cassette loading apparatus according to claim 3, wherein each of said guide rollers are received within a corresponding one of said horizontal guide portions in a position intermediate said insertion opening and a corresponding one of said guide pins of said holder.

5. A cassette loading apparatus according to claim 1, wherein each of said sliders is disposed between one of said side faces of said holder and one of said side plates.

* * * * *